US012156015B2

(12) United States Patent
Boerum et al.

(10) Patent No.: US 12,156,015 B2
(45) Date of Patent: Nov. 26, 2024

(54) SYSTEM FOR AND METHOD OF GENERATING AN AUDIO IMAGE

(71) Applicant: AUDIBLE REALITY INC., Montreal (CA)

(72) Inventors: Matthew Boerum, Brighton, MA (US); Bryan Martin, Montreal (CA)

(73) Assignee: AUDIBLE REALITY INC., Montreal (CA)

( * ) Notice: Subject to any disclaimer, the term of this patent is extended or adjusted under 35 U.S.C. 154(b) by 0 days.

(21) Appl. No.: 17/980,370

(22) Filed: Nov. 3, 2022

(65) Prior Publication Data

US 2023/0050329 A1 Feb. 16, 2023

Related U.S. Application Data

(63) Continuation of application No. 17/023,257, filed on Sep. 16, 2020, now Pat. No. 11,516,616, which is a
(Continued)

(51) Int. Cl.
*H04S 7/00* (2006.01)
*G10L 19/008* (2013.01)

(52) U.S. Cl.
CPC ............ *H04S 7/304* (2013.01); *G10L 19/008* (2013.01); *H04S 2400/01* (2013.01);
(Continued)

(58) Field of Classification Search
CPC .. H04S 7/304; H04S 2400/01; H04S 2400/03; H04S 2400/11; H04S 2420/01; G10L 19/008
See application file for complete search history.

(56) References Cited

U.S. PATENT DOCUMENTS 6,027,428 A 2/2000 Thomas et al.
6,741,706 B1 5/2004 Mcgrath et al.
(Continued)

FOREIGN PATENT DOCUMENTS

CN 102694764 A 9/2012
CN 104021373 A 9/2014
(Continued)

OTHER PUBLICATIONS

Vocal.com, Early Reflections, published Jul. 2017, https://web.archive.org/web/20170703180923/https://vocal.com/dereverberation/early-reflections/ (Year: 2017).*
(Continued)

*Primary Examiner* — Mark Fischer
(74) *Attorney, Agent, or Firm* — BCF LLP

(57) ABSTRACT

A system for and a method of generating an audio image for use in rendering audio. The method comprises accessing an audio stream; accessing positional information, the positional information comprising a first position, a second position and a third position; and generating an audio image. In some embodiments, generating the audio image comprises generating, based on the audio stream, a first virtual wave front to be perceived by a listener as emanating from the first position; generating, based on the audio stream, a second virtual wave front to be perceived by the listener as emanating from the second position; and generating, based on the audio stream, a third virtual wave front to be perceived by the listener as emanating from the third position.

21 Claims, 28 Drawing Sheets

Related U.S. Application Data continuation of application No. 16/388,146, filed on Apr. 18, 2019, now Pat. No. 10,820,135, which is a continuation of application No. PCT/IB2017/056471, filed on Oct. 18, 2017.

(60) Provisional application No. 62/410,132, filed on Oct. 19, 2016.

(52) U.S. Cl.
CPC ....... *H04S 2400/03* (2013.01); *H04S 2400/11* (2013.01); *H04S 2400/15* (2013.01); *H04S 2420/01* (2013.01)

(56) References Cited

U.S. PATENT DOCUMENTS

| | | | | |
|---|---|---|---|---|
| 8,619,998 | B2 | 12/2013 | Walsh et al. | |
| 9,094,771 | B2 | 7/2015 | Tsingos et al. | |
| 9,172,901 | B2 | 10/2015 | Chabanne et al. | |
| 10,820,135 | B2 * | 10/2020 | Boerum | H04S 7/304 |
| 11,516,616 | B2 * | 11/2022 | Boerum | H04S 7/304 |
| 2007/0297616 | A1 * | 12/2007 | Plogsties | H04S 3/004 381/23 |
| 2008/0298610 | A1 | 12/2008 | Virolainen et al. | |
| 2012/0213375 | A1 | 8/2012 | Mahabub et al. | |
| 2014/0185812 | A1 | 7/2014 | Van Achte et al. | |
| 2014/0185844 | A1 | 7/2014 | Haurais et al. | |
| 2014/0219455 | A1 | 8/2014 | Peters et al. | |
| 2014/0355796 | A1 | 12/2014 | Xiang et al. | |
| 2015/0293655 | A1 | 10/2015 | Tan | |
| 2017/0223478 | A1 | 8/2017 | Jot et al. | |

FOREIGN PATENT DOCUMENTS

| | | | |
|---|---|---|---|
| EP | 1613127 | A1 | 1/2006 |
| EP | 2873254 | A1 | 5/2015 |
| WO | 99/49574 | A1 | 9/1999 |
| WO | 2012088336 | A2 | 6/2012 |
| WO | 2014/014891 | A1 | 1/2014 |
| WO | 2014159376 | A1 | 10/2014 |
| WO | 2014194005 | A1 | 12/2014 |
| WO | 2015134658 | A1 | 9/2015 |
| WO | 2015147619 | A1 | 10/2015 |

OTHER PUBLICATIONS

International Search Report and Written Opinion issued on Mar. 1, 2018 in corresponding International patent application No. PCT/IB2017/056471.

Siltanen et al., "Rays or Waves? Understanding the Strengths and Weaknesses of Computational Room Acoustics Modeling Techniques", Proceedings of the International Symposium of Room Acoustics, ISRA 2010, Melbourne, Australia, Aug. 29-31, 2010.

Rober et al., "Ray Acoutics Using Computer Graphics Technology", Proceeding of the 10th International Conference on Digital Audio Effects (DAFx-07), Bordeaux, France, Sep. 10-15, 2007.

Kiminki, "Sound Propagation Theory for Linear Ray Acoustic Modelling", Master's Thesis, Helsinki University of Technology, Department of Computer Science and Engineering, Telecommunications Software and Multimedia Laboratory, Mar. 7, 2005.

Begault, D.R., "3-D Sound for Virtual Reality and Multimedia", National Aeronautics and Space Administration, NASA/TM-2000-209606.

Blauert, J., "Communication Acoustics", Springer—Verlag Berlin Heidelberg, 2005, Chapters 1 and 4.

Vorlander, M., "Auralization of spaces", Physics Today, American Institute of Physics, S-0031-9228-0906-020-7, Jun. 2009, pp. 35-40.

Everest, F.A. et al., "Master Handbook of Acoustics, Fifth Edition", The McGraw-Hill Companies, Inc., 2009, Chapters 18 and 26.

Melchior, F., "The theory and practice of generating improved deadphone experiences, Part II", BBC R&D.

European Search Report with regard to the counterpart EP Patent Application No. 17861420.2 mailed Jun. 25, 2019.

Bernschutz, "A Spherical Far Field HRIR/HRTF Compilation of the Neumann KU100", AIA-DAGA 2013 Merano, Proceedings of the International Conference on Acoustics, pp. 592-595.

English Abstract for CN102694764 retrieved on Espacenet on Feb. 19, 2021.

English Abstract for CN104021373 retrieved on Espacenet on Feb. 19, 2021.

Communication pursuant to Article 94(3) EPC with regard to the counterpart EP Patent Application No. 17861420.2 mailed Jul. 15, 2021.

Sorensen, "Waves And Rays—Acoustic Fields", May 23, 2013 , XP055822573, Retrieved from the Internet URL: https://www.acousticfields.com/waves-and-rays/? nab=1 &utm_referrer=https://www.google.de/, 12 pages.

* cited by examiner

SYSTEM FOR AND METHOD OF GENERATING AN AUDIO IMAGE

CROSS-REFERENCE TO RELATED APPLICATION

The present Application claims priority to U.S. Provisional Patent Application No. 62/410,132 filed on Oct. 19, 2016, the entire disclosure of which is incorporated herein by reference. The present application is a continuation of U.S. patent application Ser. No. 17/023,257 filed on Sep. 16, 2020, which itself is a continuation of U.S. patent application Ser. No. 16/388,146 filed on Apr. 18, 2019, which itself is a continuation of International Patent Application no. PCT/IB2017/056471, filed on Oct. 18, 2017, entitled "SYSTEM FOR AND METHOD OF GENERATING AN AUDIO IMAGE". These applications are incorporated by reference herein in their entirety.

FIELD

The present technology relates to systems and methods of generating an audio image. In particular, the systems and methods allow generating an audio image for use in rendering audio to a listener.

BACKGROUND

Humans have only two ears, but can nonetheless locate sounds in three dimensions. The brain, inner ears, and external ears work together to infer locations of audio sources. In order for a listener to localize sound in three dimensions, the sound must perceptually arrive from a specific azimuth, elevation and distance. The brain of the listener estimates the source location of an audio source by comparing first cues perceived by a first ear to second cues perceived by a second ear to derive difference cues based on time of arrival, intensity and spectral differences. The brain may then rely on the difference cues to locate the specific azimuth, elevation and distance of the audio source.

From the phonograph developed by Edison and described in U.S. Patent 200,521 to the most recent developments in spatial audio, audio professionals and engineers have dedicated tremendous efforts to try to reproduce reality as we hear it and feel it in real life. This objective has become even more prevalent with the recent developments in virtual and augmented reality as audio plays a critical role in providing an immersive experience to a user. As a result, the field of spatial audio has gained a lot of attentions over the last few years. Recent developments in spatial audio mainly focus on improving how source location of an audio source may be captured and/or reproduced. Such developments typically involve virtually positioning and/or displacing audio sources anywhere in a virtual three-dimensional space: comprising behind, in front, on the sides, above and/or below the listener.

Examples of recent developments in perception of locations and movements of audio sources comprise technologies such as (1) Dolby Atmos® from Dolby Laboratories, mostly dedicated to commercial and/or home theaters, and (2) Two Big Ears® from Facebook (also referred to as Facebook 360®), mostly dedicated to creation of audio content to be played back on headphones and/or loudspeakers. As a first example, Dolby Atmos® technology allows numerous audio tracks to be associated with spatial audio description metadata (such as location and/or pan automation data) and to be distributed to theaters for optimal, dynamic rendering to loudspeakers based on the theater capabilities. As a second example, Two Big Ears® technology comprises software suites (such as the Facebook 360 Spatial Workstation) for designing spatial audio for 360 video and/or virtual reality (VR) and/or augmented reality (AR) content. The 360 video and/or the VR and/or the AR content may then be dynamically rendered on headphones or VR/AR headsets.

Existing technologies typically rely on spatial domain convolution of sound waves using head-related transfer functions (HRTFs) to transform sound waves so as to mimic natural sounds waves which emanate from a point of a three-dimensional space. Such technics allow, within certain limits, tricking the brain of the listener to pretend to place different sound sources in different three-dimensional locations upon hearing audio streams, even though the audio streams are produced from only two speakers (such as headphones or loudspeakers). Examples of systems and methods of spatial audio enhancement using HRTFs may be found in U.S. Patent Publication 2014/0270281 to Creative Technology Ltd, International Patent Publication WO 2014/159376 to Dolby Laboratories Inc. and International Patent Publication WO 2015/134658 to Dolby Laboratories Licensing Corporation.

Even though current technologies, such as the ones detailed above, may allow bringing a listener a step closer to an immersive experience, they still present at least certain deficiencies. First, current technologies may present certain limits in tricking the brain of the listener to pretend to place and displace different sound sources in three-dimensional locations. These limits result in a lower immersive experience and/or a lower quality of audio compared to what the listener would have had experiences in real life. Second, at least some current technologies require complex software and/or hardware components to operate conventional HRTF simulation software. As audio content is increasingly being played back through mobile devices (e.g., smart phones, tablets, laptop computers, headphones, VR headsets, AR headsets), complex software and/or hardware components may not always be appropriate as they require substantial processing power that mobile devices may not have as such mobile devices are usually lightweight, compact and low-powered.

Improvements may be therefore desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) a limited quality of an immersive experience, (2) a limited ability to naturally render audio content to a listener and/or (3) a required processing power of a device used to produce spatial audio content and/or play-back spatial audio content to a listener.

In one aspect, various implementations of the present technology provide a method of generating an audio image for use in rendering audio, the method comprising:

accessing an audio stream;
accessing a first positional impulse response, the first positional impulse response being associated with a first position;
accessing a second positional impulse response, the second positional impulse response being associated with a second position;
accessing a third positional impulse response, the third positional impulse response being associated with a third position;
generating the audio image by executing:
generating, based on the audio stream and the first positional impulse response, a first virtual wave front to be perceived by a listener as emanating from the first position;
generating, based on the audio stream and the second positional impulse response, a second virtual wave front to be perceived by the listener as emanating from the second position; and
generating, based on the audio stream and the third positional impulse response, a third virtual wave front to be perceived by the listener as emanating from the third position.

In another aspect, various implementations of the present technology provide a method of generating an audio image for use in rendering audio, the method comprising:
accessing an audio stream;
accessing positional information, the positional information comprising a first position, a second position and a third position;
generating the audio image by executing:
generating, based on the audio stream, a first virtual wave front to be perceived by a listener as emanating from the first position;
generating, based on the audio stream, a second virtual wave front to be perceived by the listener as emanating from the second position; and
generating, based on the audio stream, a third virtual wave front to be perceived by the listener as emanating from the third position.

In yet another aspect, various implementations of the present technology provide a method of generating a volumetric audio image for use in rendering audio, the method comprising:
accessing an audio stream;
accessing a first positional impulse response;
accessing a second positional impulse response;
accessing a third positional impulse response;
accessing control data, the control data comprising a first position, a second position and a third position;
associating the first positional impulse response with the first position, the second positional impulse response with the second position and the third positional impulse response with the third position;
generating the volumetric audio image by executing the following steps in parallel:
generating a first virtual wave front emanating from the first position by convolving the audio stream with the first positional impulse response;
generating a second virtual wave front emanating from the second position by convolving the audio stream with the second positional impulse response;
generating a third virtual wave front emanating from the third position by convolving the audio stream with the third positional impulse response; and
mixing the first virtual wave front, the second virtual wave front and the third virtual wave front to render the volumetric audio image.

In another aspect, various implementations of the present technology provide a method of generating an audio image for use in rendering audio, the method comprising:
accessing an audio stream;
accessing a first positional impulse response, the first positional impulse response being associated with a first position;
accessing a second positional impulse response, the second positional impulse response being associated with a second position;
accessing a third positional impulse response, the third positional impulse response being associated with a third position;
generating the audio image by executing in parallel:
generating a first virtual wave front by convolving the audio stream with the first positional impulse response;
generating a second virtual wave front by convolving the audio stream with the second positional impulse response; and
generating a third virtual wave front by convolving the audio stream with the third positional impulse response.

In yet another aspect, various implementations of the present technology provide a system for rendering audio output, the system comprising:
a sound-field positioner, the sound-field positioner being configured to:
access positional impulse responses and control data, the control data comprising positions associated with the positional impulse responses;
an audio image renderer, the audio image renderer being configured to:
access an audio stream;
generate an audio image comprising virtual wave fronts emanating from the positions, each one of the virtual wave fronts being generated based on the audio stream and a distinct one of the positional impulse responses; and
mixing the virtual wave fronts and output a m-channel audio output so as to render the audio image.

In another aspect, various implementations of the present technology provide a system for generating an audio image file, the system comprising:
an input interface, the input interface being configured to:
receive an audio stream;
access control data, the control data comprising positions to be associated with impulse responses;
an encoder, the encoder being configured to encode the audio stream and the control data so as to allow an audio image renderer to generate an audio image comprising virtual wave fronts emanating from the positions, each one of the virtual wave fronts being generated based on the audio stream and a distinct one of the positional impulse responses.

In yet another aspect, various implementations of the present technology provide a method of filtering an audio stream, the method comprising:
accessing the audio stream;
accessing dimensional information relating to a space;
determining a frequency where sound transitions from wave to ray acoustics within the space; and
dividing the audio stream into a first audio sub-stream and a second audio sub-stream based on the frequency.

In another aspect, various implementations of the present technology provide a system for generating an audio image, the system comprising:

a processor;

a non-transitory computer-readable medium, the non-transitory computer-readable medium comprising control logic which, upon execution by the processor, causes:

accessing an audio stream;

accessing a first positional impulse response, the first positional impulse response being associated with a first position;

accessing a second positional impulse response, the second positional impulse response being associated with a second position;

accessing a third positional impulse response, the third positional impulse response being associated with a third position;

generating the audio image by executing:

generating, based on the audio stream and the first positional impulse response, a first virtual wave front to be perceived by a listener as emanating from the first position;

generating, based on the audio stream and the second positional impulse response, a second virtual wave front to be perceived by the listener as emanating from the second position; and generating, based on the audio stream and the third positional impulse response, a third virtual wave front to be perceived by the listener as emanating from the third position.

In yet another aspect, various implementations of the present technology provide a system for generating an audio image, the system comprising:

a processor;

a non-transitory computer-readable medium, the non-transitory computer-readable medium comprising control logic which, upon execution by the processor, causes:

accessing an audio stream;

accessing positional information, the positional information comprising a first position, a second position and a third position;

generating the audio image by executing in parallel:

generating, based on the audio stream, a first virtual wave front to be perceived by a listener as emanating from the first position;

generating, based on the audio stream, a second virtual wave front to be perceived by the listener as emanating from the second position; and generating, based on the audio stream, a third virtual wave front to be perceived by the listener as emanating from the third position.

In another aspect, various implementations of the present technology provide a system for generating a volumetric audio image, the system comprising:

a processor;

a non-transitory computer-readable medium, the non-transitory computer-readable medium comprising control logic which, upon execution by the processor, causes:

accessing an audio stream;

accessing a first positional impulse response;

accessing a second positional impulse response;

accessing a third positional impulse response;

accessing control data, the control data comprising a first position, a second position and a third position;

associating the first positional impulse response with the first position, the second positional impulse response with the second position and the third positional impulse response with the third position;

generating the volumetric audio image by executing the following steps in parallel:

generating a first virtual wave front emanating from the first position by convolving the audio stream with the first positional impulse response;

generating a second virtual wave front emanating from the second position by convolving the audio stream with the second positional impulse response;

generating a third virtual wave front emanating from the third position by convolving the audio stream with the third positional impulse response; and mixing the first virtual wave front, the second virtual wave front and the third virtual wave front to render the volumetric audio image.

In yet another aspect, various implementations of the present technology provide a system for generating an audio image, the system comprising:

a processor;

a non-transitory computer-readable medium, the non-transitory computer-readable medium comprising control logic which, upon execution by the processor, causes:

accessing an audio stream;

accessing a first positional impulse response, the first positional impulse response being associated with a first position;

accessing a second positional impulse response, the second positional impulse response being associated with a second position;

accessing a third positional impulse response, the third positional impulse response being associated with a third position;

generating the audio image by executing in parallel:

generating a first virtual wave front by convolving the audio stream with the first positional impulse response;

generating a second virtual wave front by convolving the audio stream with the second positional impulse response; and generating a third virtual wave front by convolving the audio stream with the third positional impulse response.

In another aspect, various implementations of the present technology provide a system for filtering an audio stream, the system comprising:

a processor;

a non-transitory computer-readable medium, the non-transitory computer-readable medium comprising control logic which, upon execution by the processor, causes:

accessing the audio stream;

accessing dimensional information relating to a space;

determining a frequency where sound transitions from wave to ray acoustics within the space; and dividing the audio stream into a first audio sub-stream and a second audio sub-stream based on the frequency.

In yet another aspect, various implementations of the present technology provide a non-transitory computer readable medium comprising control logic which, upon execution by the processor, causes:

accessing an audio stream;

accessing a first positional impulse response, the first positional impulse response being associated with a first position;

accessing a second positional impulse response, the second positional impulse response being associated with a second position;

accessing a third positional impulse response, the third positional impulse response being associated with a third position;

generating the audio image by executing:

generating, based on the audio stream and the first positional impulse response, a first virtual wave front to be perceived by a listener as emanating from the first position;

generating, based on the audio stream and the second positional impulse response, a second virtual wave front to be perceived by the listener as emanating from the second position; and generating, based on the audio stream and the third positional impulse response, a third virtual wave front to be perceived by the listener as emanating from the third position.

In another aspect, various implementations of the present technology provide a method of generating an audio image for use in rendering audio, the method comprising:

accessing an audio stream;

accessing a first positional impulse response, the first positional impulse response being associated with a first position;

accessing a second positional impulse response, the second positional impulse response being associated with a second position;

accessing a third positional impulse response, the third positional impulse response being associated with a third position;

generating the audio image by executing:

convolving the audio stream with the first positional impulse response;

convolving the audio stream with the second positional impulse response; and convolving the audio stream with the third positional impulse response.

In other aspects, convolving the audio stream with the first positional impulse response, convolving the audio stream with the second positional impulse response and convolving the audio stream with the third positional impulse response are executed in parallel.

In other aspects, various implementations of the present technology provide a non-transitory computer-readable medium storing program instructions for generating an audio image, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for generating an audio image, the program instructions being executable by the at least one processor of the electronic device to carry out one or more of the above-recited methods.

In the context of the present specification, unless expressly provided otherwise, a computer system may refer, but is not limited to, an "electronic device", a "mobile device", an "audio processing device", "headphones", a "headset", a "VR headset device", an "AR headset device", a "system", a "computer-based system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
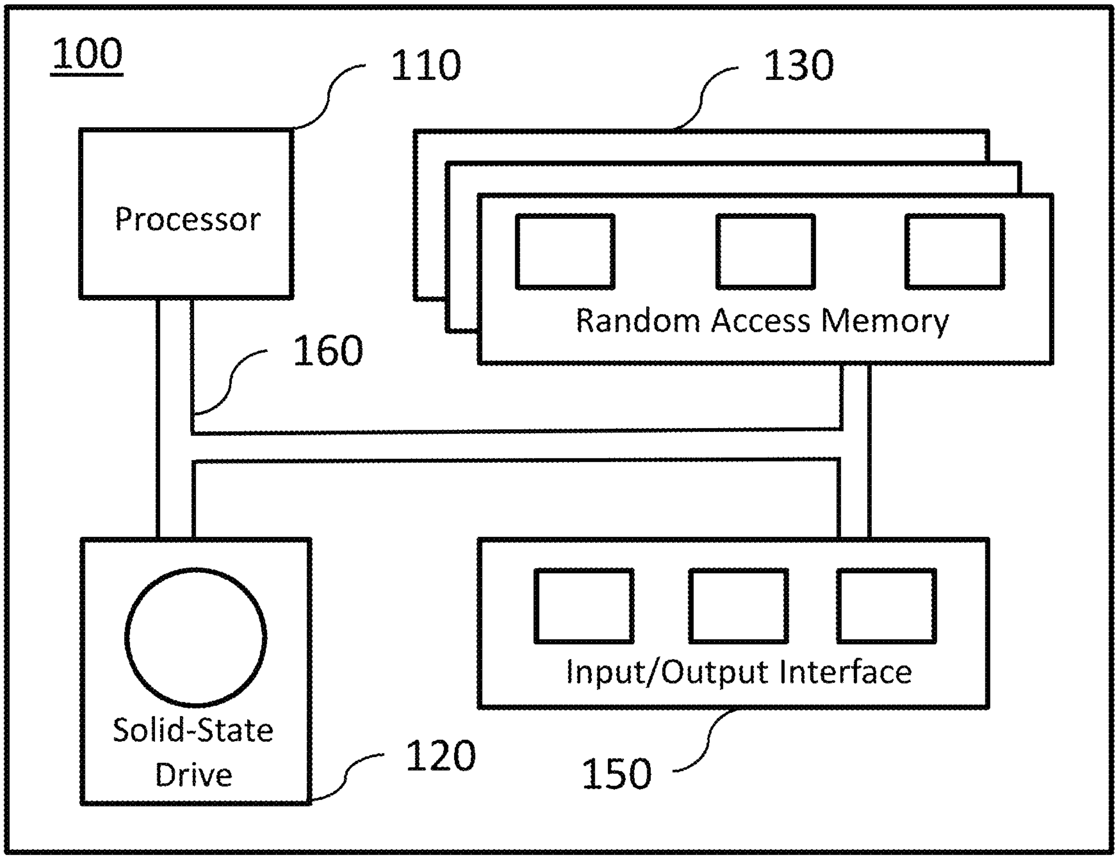
FIG. 1 is a diagram of a computing environment in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a “processor”, a “controller”, an “encoder”, a “sound-field positioner”, a “renderer”, a “decoder”, a “filter”, a “localisation convolution engine”, a “mixer” or a “dynamic processor” may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term “processor”, “controller”, “encoder”, “sound-field positioner”, “renderer”, “decoder”, “filter”, “localisation convolution engine”, “mixer” or “dynamic processor” should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Throughout the present disclosure, reference is made to audio image, audio stream, positional impulse response and virtual wave front. It should be understood that such reference is made for the purpose of illustration and is intended to be exemplary of the present technology.

Audio image: an audio signal or a combination of audio signals generated in such a way that, upon being listened to by a listener, a perception of a volumetric audio envelope similar to what the listener would experience in real life is recreated. While conventional audio systems, such as headphones, deliver an audio experience which is limited to being perceived between the listener’s ears, an audio image, upon being rendered to the listener, may be perceived as a sound experience expanded to be outside and/or surrounding the head of the listener. This results in a more vibrant, compelling and life-like experience for the listener. In some embodiments, an audio image may be referred to as an holographic audio image and/or a three-dimensional audio image so as to convey a notion of volumetric envelope to be experienced by the listener. In some embodiments, the audio image may be defined by a combination of at least three virtual wave fronts. In some embodiments, the audio image may be defined by a combination of at least three virtual wave fronts generated from an audio stream.

Audio stream: a stream of audio information which may comprise one or more audio channels. An audio stream may be embedded as a digital audio signal or an analogic audio signal. In some embodiments, the audio stream may take the form a computer audio file of a predefined size (e.g., in duration) or a continuous stream of audio information (e.g., a continuous stream streamed from an audio source). As an example, the audio stream may take the form of an uncompressed audio file (e.g., a ".wav" file) or of a compressed audio file (e.g., an ".mp3" file). In some embodiments, the audio stream may comprise a single audio channel (i.e., a mono audio stream). In some other embodiments the audio stream may comprise two audio channels (i.e., a stereo audio stream) or more than two audio channels (e.g., a 5.1. audio format, a 7.1 audio format, MPEG multichannel, etc).

Positional impulse response: an output of a dynamic system when presented with a brief input signal (i.e., the impulse). In some embodiments, an impulse response describes a reaction of a system (e.g., an acoustic space) in response to some external change. In some embodiments, the impulse response enables capturing one or more characteristics of an acoustic space. In some embodiments of the present technology, impulses responses are associated with corresponding positions of an acoustic space, hence the name "positional impulse response" which may also be referred to as "PIR". Such acoustic space may be a real-life space (e.g., a small recording room, a large concert hall) or a virtual space (e.g., an acoustic sphere to be "recreated" around a head of a listener). The positional impulse responses may define a package or a set of positional impulse responses defining acoustic characteristics of the acoustic space. In some embodiments, the positional impulse responses are associated with an equipment that passes signal. The number of positional impulse responses may vary and is not limitative. The positional impulse responses may take multiple forms, for example, but without being limitative, a signal in the time domain or a signal in the frequency domain. In some embodiments, positions of each one of the positional impulse responses may be modified in real-time (e.g., based on commands of a real-time controller) or according to predefined settings (e.g., setting embedded in control data). In some embodiments, the positional impulse responses may be utilized to be convolved with an audio signal and/or an audio stream.

Virtual wave front: a virtual wave front may be defined as a virtual surface representing corresponding points of a wave that vibrates in unison. When identical waves having a common origin travel through a homogeneous medium, the corresponding crests and troughs at any instant are in phase; i.e., they have completed identical fractions of their cyclic motion, and any surface drawn through all the points of the same phase will constitute a wave front. An exemplary representation of a virtual wave front is provided in FIG. 15. In some embodiments, the virtual surface is embedded in an audio signal or a combination of audio signals to be rendered to a listener. In some embodiments, a combination of the virtual surfaces defines an audio image which, upon being rendered to the listener, is perceived as a sound experience expanded to be outside and/or surrounding the head of the listener. In some embodiments, reference is made to "virtual" wave fronts to illustrate that the wave fronts are "artificially" created in such a way that, upon being rendered to a listener, they are perceived in a similar way to "real" wave fronts in a real acoustic environment. In some embodiments, a virtual wave front may be referred to as a "VWF". In some embodiments, wherein the virtual wave fronts are to be rendered on a stereophonic setting (e.g., headphones or two loudspeakers), a virtual wave front may comprise a left component (i.e., a left virtual wave front or VWF L) and a right component (i.e., a right virtual wave front or VWF R).

With these fundamentals in place, we will now consider some non-limiting examples to illustrate various implementations of aspects of the present technology.

Figure 2:
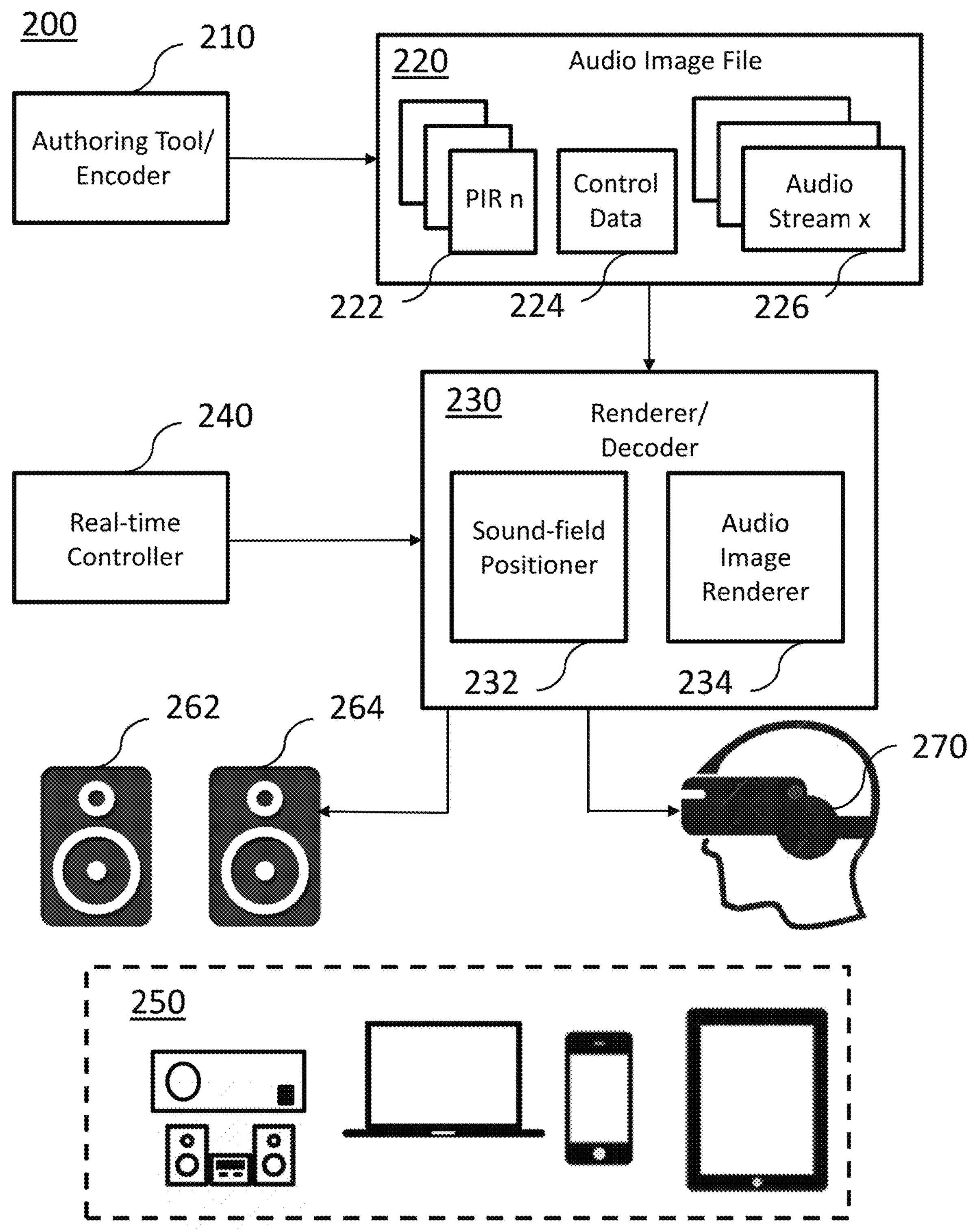
FIG. 2 is a diagram of an audio system for creating and rendering an audio image in accordance with an embodiment of the present technology.

FIG. 1 illustrates a diagram of a computing environment 100 in accordance with an embodiment of the present technology is shown. In some embodiments, the computing environment 100 may be implemented by the renderer 230, for example, but without being limited to, embodiments wherein the renderer 230 comprises a sound-field positioner 232 and/or an audio image renderer 234 as illustrated in FIG. 2. In some embodiments, the computing environment 100 comprises various hardware components including one or more single or multi-core processors collectively represented by a processor 110, a solid-state drive 120, a random access memory 130 and an input/output interface 150. The computing environment 100 may be a computer specifically designed for installation into an electronic device. In some alternative embodiments, the computing environment 100 may be a generic computer system adapted to meet certain requirements, such as, but not limited to, performance requirements. The computing environment 100 may be an "electronic device", a "controller", a "mobile device", an "audio processing device", "headphones", a "headset", a "VR headset device", a "AR headset device", a "system", a "computer-based system", a "controller", an "encoder", a "sound-field positioner", a "renderer", a "decoder", a "filter", a "localisation convolution engine", a "mixer", a "dynamic processor" and/or any combination thereof appropriate to the relevant task at hand. In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may be coupled to, for example, but without being limitative, headphones, earbuds, a set of loudspeakers, a headset, a VR headset, a AR headset and/or an audio processing unit (e.g., a recorder, a mixer).

According to implementations of the present technology, the solid-state drive 120 stores program instructions suitable for being loaded into the random access memory 130 and executed by the processor 110 for generating an audio image. For example, the program instructions may be part of a library or an application.

In some embodiments, the computing environment 100 may be configured so as to generate an audio image in accordance with the present technology described in the following paragraphs. In some other embodiments, the computing environment 100 may be configured so as to act as one or more of an "encoder", a "sound-field positioner", a "renderer", a "decoder", a "controller", a "real-time controller", a "filter", a "localisation convolution engine", a "mixer", a "dynamic processor" and/or any combination thereof appropriate to the relevant task at hand.

Referring to FIG. 2, there is shown an audio system 200 for creating and rendering an audio image. The audio system 200 comprises an authoring tool 210 for creating an audio image file 220, a renderer 230 associated with a real-time controller 240 for rendering the audio image file to a listener via loudspeakers 262, 264 and/or headphones 270 (which may also be referred to as a VR headset 270 and/or an AR headset 270).

In some embodiments, the authoring tool 210 comprises an encoder. In some embodiments, the authoring tool 210 may also be referred to as an encoder. In the illustrated embodiment, the audio image file 220 is created by the authoring tool 210 and comprises multiple positional impulse responses 222 (PIRs), control data 224 and one or more audio streams 226. Each one of the PIRs is referred to as PIR n, wherein n is an integer. Each one of the one or more audio streams 226, may be referred to as audio stream x, wherein x is an integer. In some embodiments, the PIRs 222 comprises three PIRs, namely $PIR_1$, $PIR_2$ and $PIR_3$. In some other embodiments, the PIR 222 comprises more than three PIRs.

In some embodiments, the authoring tool 210 allows creating audio image files such as the audio image file 220. Once created, the audio image files may then be stored and/or transmitted to a device for real-time or future rendering. In some embodiments, the authoring tool 210 comprises an input interface configured to access one or more audio streams and control data. The control data may comprise positions of impulse responses, the positions allowing positioning impulse responses in a three-dimensional space (such as, but not limited to, a sphere). In some embodiments, the authoring tool 210 comprises an encoder which is configured to encode, for example, in a predefined file format, the one or more audio streams and the control data so that an audio image renderer (such as, but not limited to, the audio image renderer 230) may decode the audio image file to generate an audio image based on the one or more audio streams and positional impulse responses, positions of the positional impulse responses being defined by the control data of the audio image file.

The renderer 230 may be configured to access and/or receive audio image files such as the audio image file 220. In other embodiments, the renderer 230 may independently access one or more audio streams, control data and positional impulse responses. In some embodiments, the renderer 230 may have access to a repository of control data and/or positional impulse responses and receive an audio image file solely comprising one or more audio streams. Conversely, the renderer 230 may have access to one or more audio streams and receive control data and/or positional impulse responses from an external source (such as, but not limited to, a remote server). In the illustrated embodiment, the renderer 230 comprises a sound-field positioner 232 and an audio image renderer 234. In some embodiments, the renderer 230 may also be referred to as a decoder.

The sound-field positioner 232 may be controlled by a real-time controller 240. Even though reference is made to a real-time controller 240, it should be understood that the control of the sound-field positioner 232 does not require to occur in real-time. As such, in various embodiments of the present technology, the sound-field positioner 232 may be controlled by various types of controllers, whether real-time or not. In some embodiments wherein positions of positional impulse responses and their respective positions define a sphere, the sound-field positioner 232 may be referred to as a spherical sound-field positioner. In some embodiments, the sound-field positioner 232 allows associating positional impulse responses with positions and control of such positions of the positional impulse responses as it will be further detailed below in connection with the description of FIG. 3.

The audio image renderer 234 may decode an audio image file such as the audio image file 220 to render an audio image. In some embodiments, the audio image renderer 234 may also be referred to as a three-dimensional audio experiential renderer. In some embodiments, the audio image is rendered based on an audio stream and positional impulse responses which positions are determined and/or controlled by the sound-field positioner 232. In some embodiments, the audio image is generated by combining multiple virtual wave fronts, each one of the multiple virtual wave fronts being generated by the audio image renderer 234. In some embodiments, the multiple virtual wave fronts are being generated based on the audio stream and positional impulse responses as it will be further detailed below in connection with the description of FIGS. 7 to 14. In some alternative embodiments, the multiple virtual wave fronts are being generated based on acoustic rendering and/or binaural (also referred to as perceptual) rendering. In some embodiments, the audio image renderer 234 may be configured for acoustic rendering and/or binaural (also referred to as perceptual) rendering. The acoustic rendering may comprise, in some embodiments, rendering direct sounds, rendering early reflections and/or late reflections/reverberation. Examples of acoustic rendering and/or binaural rendering are further discussed in other paragraphs of the present document.

In some embodiments, the audio image renderer 234 mixes the virtual wave fronts and outputs a m-channel audio output so as to render the audio image to a listener. In the embodiments illustrated at FIG. 2, the outputted channel is a 2-channel audio output (i.e., a stereo audio output). In some embodiments, the outputted channel is a 2-channel audio output which may also be referred to as a rendered 3D experiential 2-channel audio output.

FIG. 2 also illustrates one or more devices 250 that may be used to encode or decode an audio image file in accordance with the present technology. The one or more devices 250 may be, for example, but without being limitative, an audio system, a mobile device, a smart phone, a tablet, a computer, a dedicated system, a headset, headphones, a communication system, a VR headset and an AR headset. Those examples are provided for the sake of exemplifying embodiments of the present technology and should therefore not be construed as being limitative. In some embodiments, the one or more devices 250 may comprise components similar to those of the computing environment 100 depicted at FIG. 1. In some embodiments, each one of the one or more devices 250 may comprise the authoring tool 210, the renderer 230 and/or the real-time controller 240. In some other embodiments, a first device may comprise the authoring tool 210 which is used to generate the audio image file 220. The audio image file 220 may then be transmitted (e.g., via a communication network) to a second device which comprises the renderer 230 (and optionally the real-time controller 240). The renderer 230 of the second device may then output an audio image based on the received audio image file 220. As a person skilled in the art of the present technology will appreciate, the device on which the authoring tool 210, the renderer 230 and the real-time controller 240 are executed is not limitative and multiple variations may be envisioned without departing from the scope of the present technology.

As can be shown in FIG. 2, the audio image is rendered to a listener via the loudspeakers 262, 264 and/or the headphones 270. The loudspeakers 262, 264 and/or the headphones 270 may be connected to a device (e.g., one of the one or more devices 250). In some embodiments, the loudspeakers 262, 264 and/or the headphones 270 may be conventional loudspeakers and/or headphones not designed specifically for rendering spatial audio. The loudspeakers may comprise two or more loudspeakers disposed according to various configurations. The headphones may comprise miniature speakers (also known as drivers and transducers). In some embodiments, the headphones may comprise two drivers, a first driver to be associated with a left ear and a second driver to be associated with a right ear. In some embodiments, the headphones may comprise more than two drivers, for example, two left drivers associated with a left ear and two right drivers associated with a right ear. In some embodiments, the headphones may fully or partially covering ears of a listener. In some embodiments, the headphones may be placed within a listener ear (e.g., earbuds or in-ear headphones). In some embodiments, the headphones may also comprise a microphone in addition to speakers (e.g., a headset). In some embodiments, the headphones may be part of a more complex system such as VR headsets and/or AR headsets. In some alternative embodiments, the loudspeakers and/or headphones may be specifically designed for spatial audio reproduction. In such embodiments, the loudspeakers and/or headphones may comprise one or more of 3D audio algorithms, head-tracking, anatomy calibration and/or multiple drivers at each ear. In some embodiments, the loudspeakers and/or the headphones may also comprise a computing environment similar to the computing environment of FIG. 1 which allows the loudspeakers and/or the headphones to execute one or more of the authoring tool 210, the renderer 230 and the real-time controller 240 without requiring any additional devices.

Figure 3:
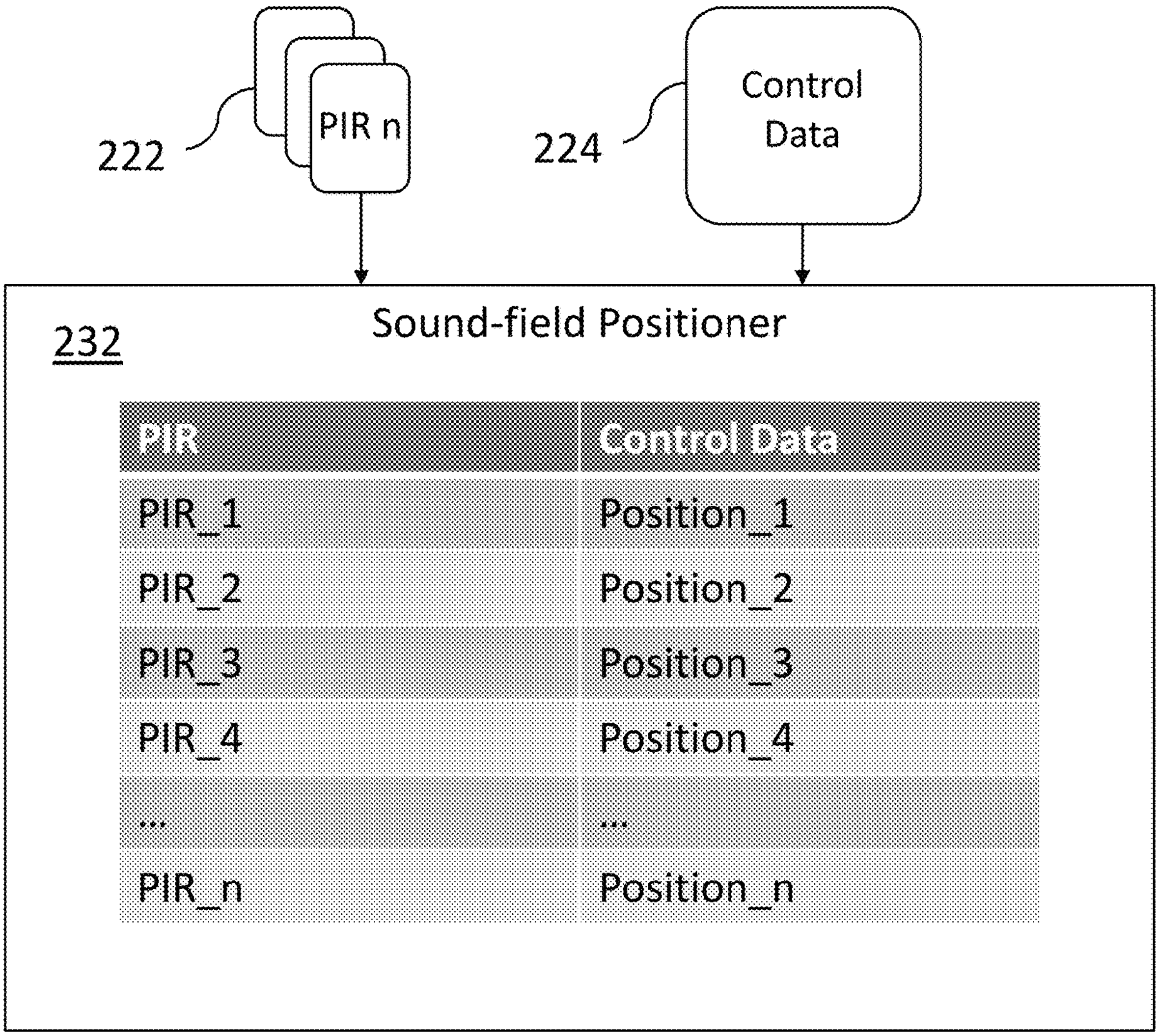
FIG. 3 is a diagram of a correspondence table associating positional impulse responses with positions in accordance with an embodiment of the present technology.
Figure 4:
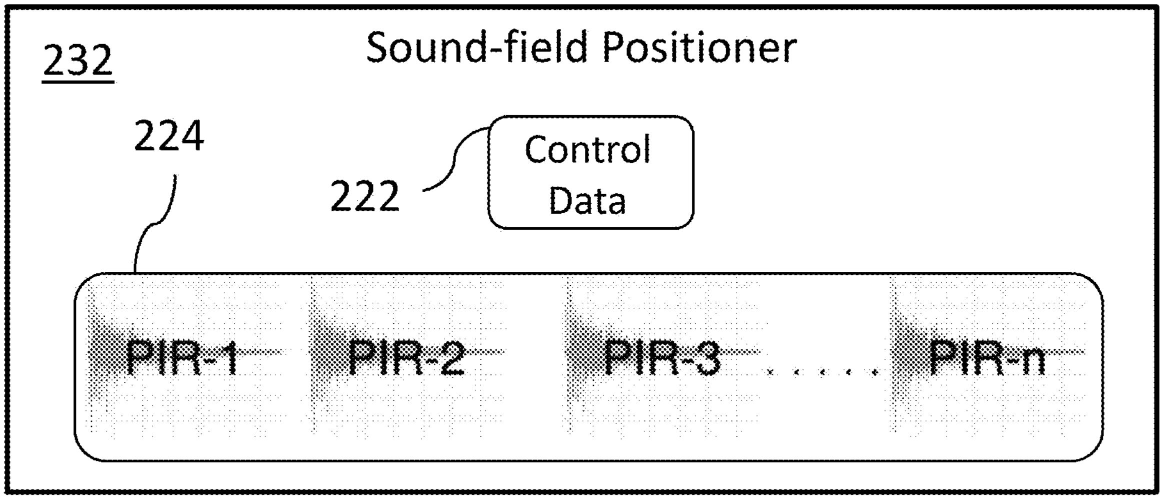
FIG. 4 is a representation of positional impulse responses and a three-dimensional space in accordance with an embodiment of the present technology.
Figure 4:
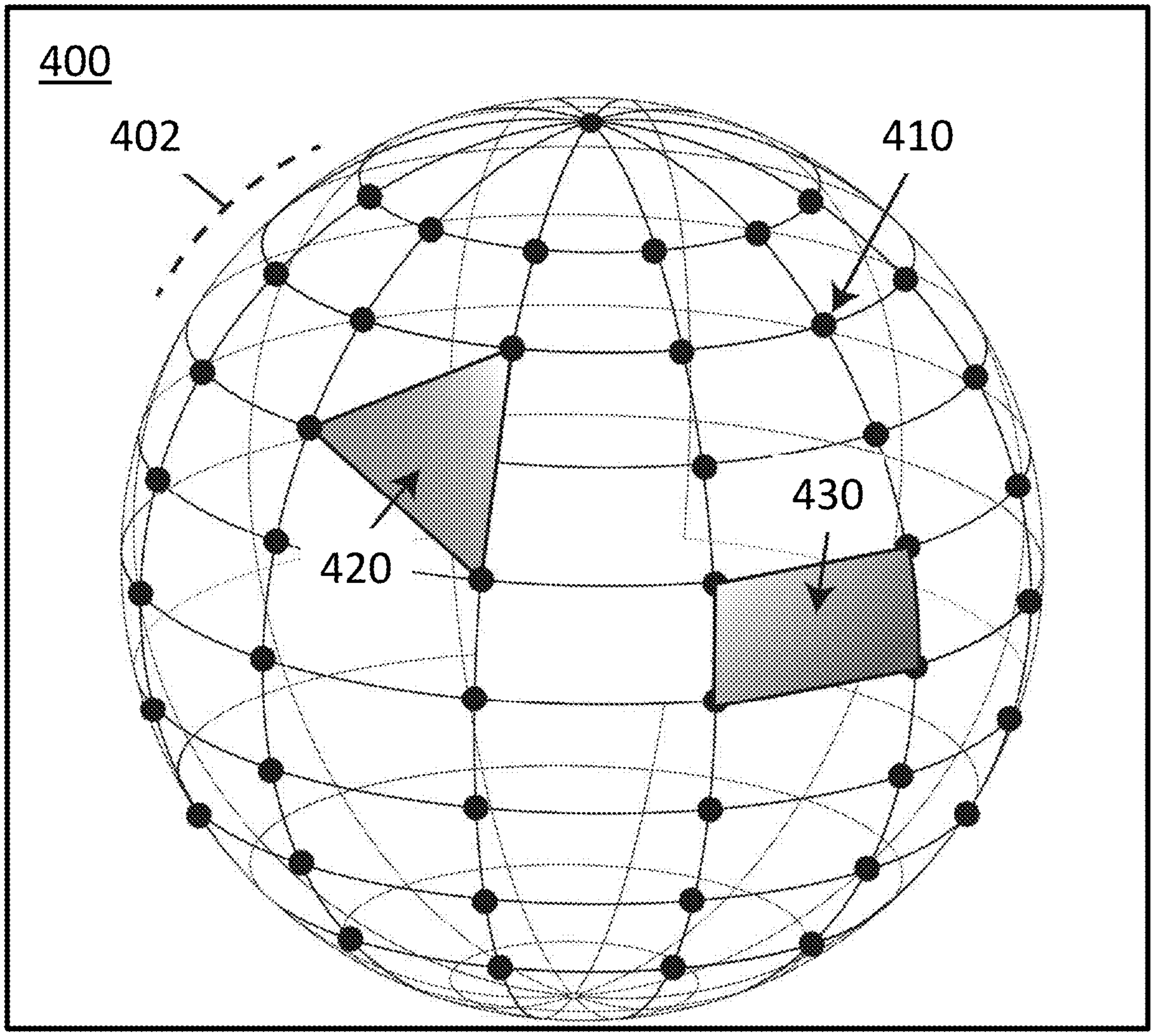

Turning now to FIGS. 3 and 4, the sound-field positioner 232 is illustrated with a correspondence table associating positional impulse responses with positions. In some embodiments, the positional impulse responses are accessed from a set of positional impulse responses, such as the PIRs 222. In some embodiments, the positions are accessed from control data, such as the control data 224. As illustrated at FIG. 2, the PIRs 222 and the control data 224 may be accessed from an audio image file, such as the audio image file 220. In some embodiments, the sound-field positioner 232 may associate each one of the positions Position_1 to Position_n with each one of the positional impulse responses PIR_1 to PIR_n. In other embodiments, each one of the positions Position_1 to Position_n has been previously associated with a respective one of the positional impulse responses PIR_1 to PIR_n. Such associations of the positions and the positional impulse responses may be accessed by the sound-field positioner 232 from the control data 224.

As illustrated in FIG. 4, the positional impulse responses PIR_1 to PIR_n are represented as brief signals which may also be referred to as pulses or impulses. As the person skilled in the art of the present technology may appreciate, each one of the PIR_1 to PIR_n may be associated with a different pulse, each one of the different pulses being representative of acoustic characteristics at a given positon. In the illustrated embodiments, the control data 222 and the positional impulse responses 224 allow modeling acoustic characteristics of a three-dimensional space 400 represented as a sphere 400. The sphere 400 comprises a mesh defined by multiple positional impulse responses. Each one of the positional impulse responses being represented as a dot on the sphere 402. An example of such a dot, is a dot 410 represented by a positional impulse response 410 which location on the sphere is determined by a corresponding position. In some embodiments, the control data 222 allows positioning the positional impulse response 410 on the sphere. In some embodiments, the position may remain fixed while in other embodiments the position may be modified (either in real-time or not) via a controller (e.g., the real-time controller 240).

In some embodiments, multiple positional impulse responses may be combined together to define a polygonal positional impulse response. Such polygonal positional impulse response is illustrated by a first polygonal positional impulse response 420 and a second polygonal positional impulse response 430.

The first polygonal positional impulse response 420 comprises a first positional impulse response, a second positional impulse response and a third positional impulse response. Each one of the first positional impulse response, the second positional impulse response and the third positional impulse response is associated with a respective position. The combination of all three positions thereby defines the geometry of the first polygonal positional impulse response 420, in the present case, a triangle. In some embodiments, the geometry may be modified (either in real-time or not) via a controller (e.g., the real-time controller 240) and may define any shape (e.g., the three positions may define a line).

The second polygonal positional impulse response 430 comprises a fourth positional impulse response, a fifth positional impulse response, a sixth positional impulse response and a seventh positional impulse response. Each one of the fourth positional impulse response, the fifth positional impulse response, the sixth positional impulse response and the seventh positional impulse response is associated with a respective position. The combination of all four positions thereby defines the geometry of the second polygonal positional impulse response 430, in the present case, a quadrilateral. In some embodiments, the geometry may be modified (either in real-time or not) via a controller (e.g., the real-time controller 240).

In some embodiments, the first polygonal positional impulse response 420 and the second polygonal positional impulse response 430 may be relied upon to generate one or more audio images as it will be further depicted below in connection with the description of FIGS. 7 to 15.

Even though the example of FIG. 4 illustrates a combination of multiple positional impulse responses defining a sphere, it should be understood that the number of positional impulse responses, the respective position of each one of the positional impulse responses and the geometry of the three-dimensional space may vary and should therefore not be construed as being limitative. For example, but without being limitative, the geometry of the three-dimensional space may define a cube or any other geometry. In some embodiments, the geometry of the three-dimensional space may represent a virtual space (e.g., a sphere) and/or a real acoustic space.

Figure 5:
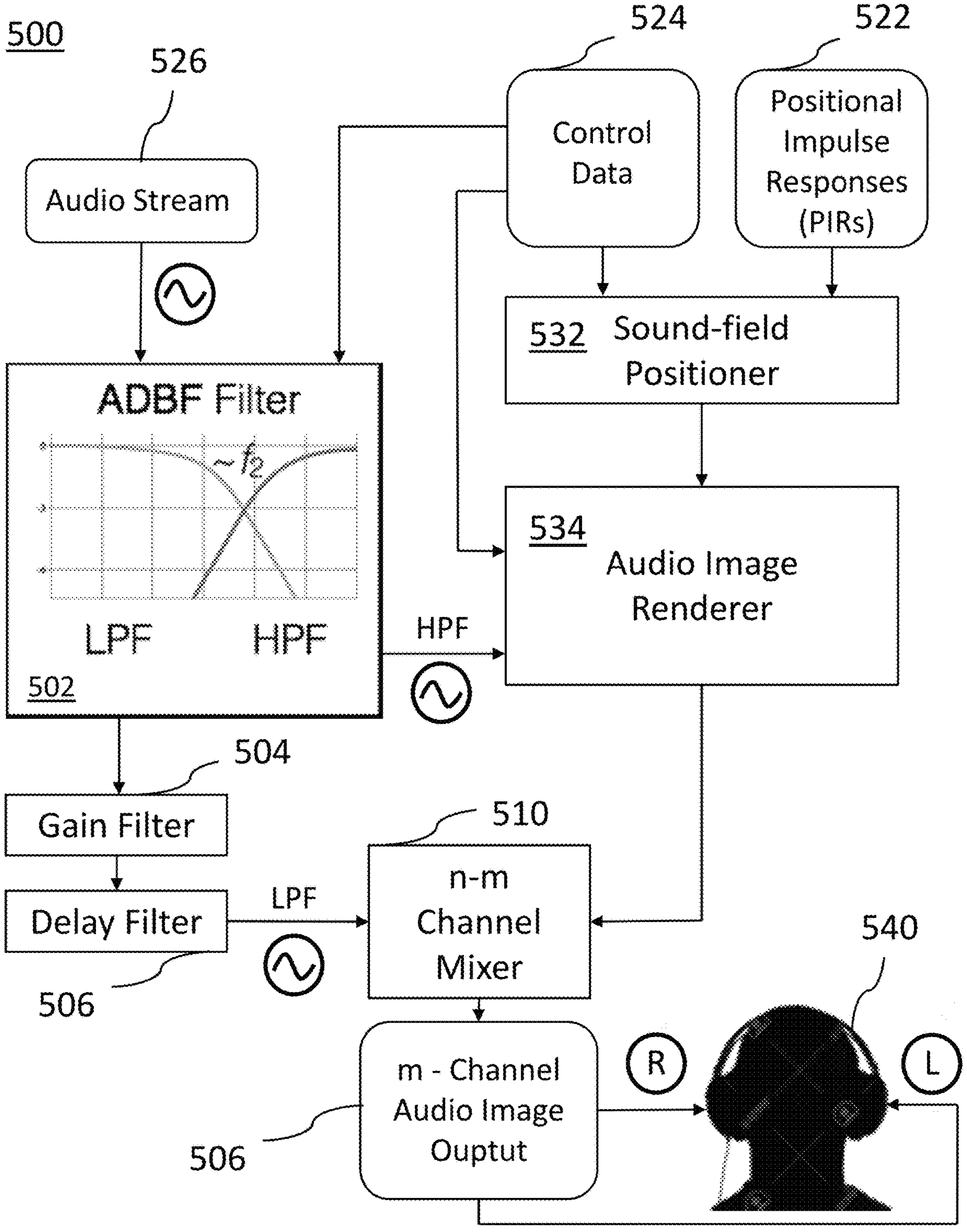
FIG. 5 is a diagram of an audio rendering system in accordance with an embodiment of the present technology.

Referring now to FIG. 5, an audio rendering system 500 is depicted. In some embodiments, the audio rendering system 500 may be implemented on a computing environment similar to the one described in FIG. 1. For example, but without being limitative, the audio rendering system 500 may be one of the one or more devices 250 illustrated at FIG. 2. The audio rendering system 500 comprises an acoustically determined band (ADBF) filter 502, a gain filter 504, a delay filter 506, a sound-field positioner 532, an audio image renderer 534 and a n-m channel mixer 510. In some embodiments, the sound-field positioner 532 is similar to the sound-field positioner 232 depicted in FIG. 2 and the audio image renderer 534 is similar to the audio image renderer 234. In some embodiments, the audio image renderer 534 may be referred to as a renderer and/or a decoder. In some embodiments, the audio image renderer 534 may comprise the ADBF filter 502, the sound-field positioner 532, the gain filter 504, the delay filter 506 and/or the n-m channel mixer 510. As the person skilled in the art of the present technology may appreciate, many combinations of the ADBF filter 502, the sound-field positioner 532, the gain filter 504, the delay filter 506 and/or the n-m channel mixer 510 may be envisioned as defining a renderer (or, for the sake of the present example, the audio image renderer 534).

In the example of FIG. 5, an audio stream 526, positional impulse responses (PIRs) 522 and control data 524 are accessed for example, but without being limitative, by a renderer from an audio image file. The audio image file may be similar to the audio image file 220 of FIG. 2.

In some embodiments, the control data 524 and the PIRs 522 are accessed by the sound-field positioner 532. The control data 524 may also be accessed and/or relied upon by the audio image renderer 534. In some embodiments, such as the one illustrated at FIG. 6, the control data 524 may also be accessed and/or relied upon by the n-m channel mixer 510.

In the illustrated embodiments, the audio stream 526 is filtered by the ADBF filter 502 before being processed by the audio image renderer 524. It should be understood that even though a single audio stream is illustrated, the processing of multiple audio streams is also envisioned, as previously discussed in connection with the description of FIG. 2. The ADBF filter 502 is configured to divide the audio stream 526 by generating a first audio sub-stream by applying a high-pass filter (HPF) and a second audio sub-stream by applying a low-pass filter (LPF). The first audio sub-stream is transmitted to the audio image renderer 534 for further processing. The second audio sub-stream is transmitted to the gain filter 504 and to the delay filter 506 so that a gain and/or a delay may be applied to the second audio sub-stream. The second audio sub-stream is then transmitted to the n-m channel mixer 510 where it is mixed with a signal outputted by the audio image renderer 524. In some alternative embodiments, the audio stream 526 may be directly accessed by the audio image renderer 534 without having been previously filtered by the ADBF filter 502.

As it may be appreciated by a person skilled in the art of the present technology, the n-m channel mixer 510 may take 2 or more channels as an input and output 2 or more channels. In the illustrated example, the n-m channel mixer 510 takes the second audio sub-stream transmitted by the delay filter 506 and the signal outputted by the audio image renderer 524 and mixes them to generate an audio image output. In some embodiments wherein 2 channels are to be outputted, the n-m channel mixer 510 takes (1) the second audio sub-stream associated with a left channel transmitted by the delay filter 506 and the signal associated with a left channel outputted by the audio image renderer 524 and (2) the second audio sub-stream associated with a right channel transmitted by the delay filter 506 and the signal associated with a right channel outputted by the audio image renderer 524 to generate a left channel and a right channel to be rendered to a listener. In some alternative embodiments, the n-m channel mixer 510 may output more than 2 channels, for example, for cases where the audio image is being rendered on more than two speakers. Such cases include, without being limitative, cases where the audio image is being rendered on headphones having two or more drivers associated with each ear and/or cases where the audio image is being rendered on more than two loudspeakers (e.g., 5.1, 7.1, Dolby AC-4® from Dolby Laboratories, Inc. settings).

Figure 6:
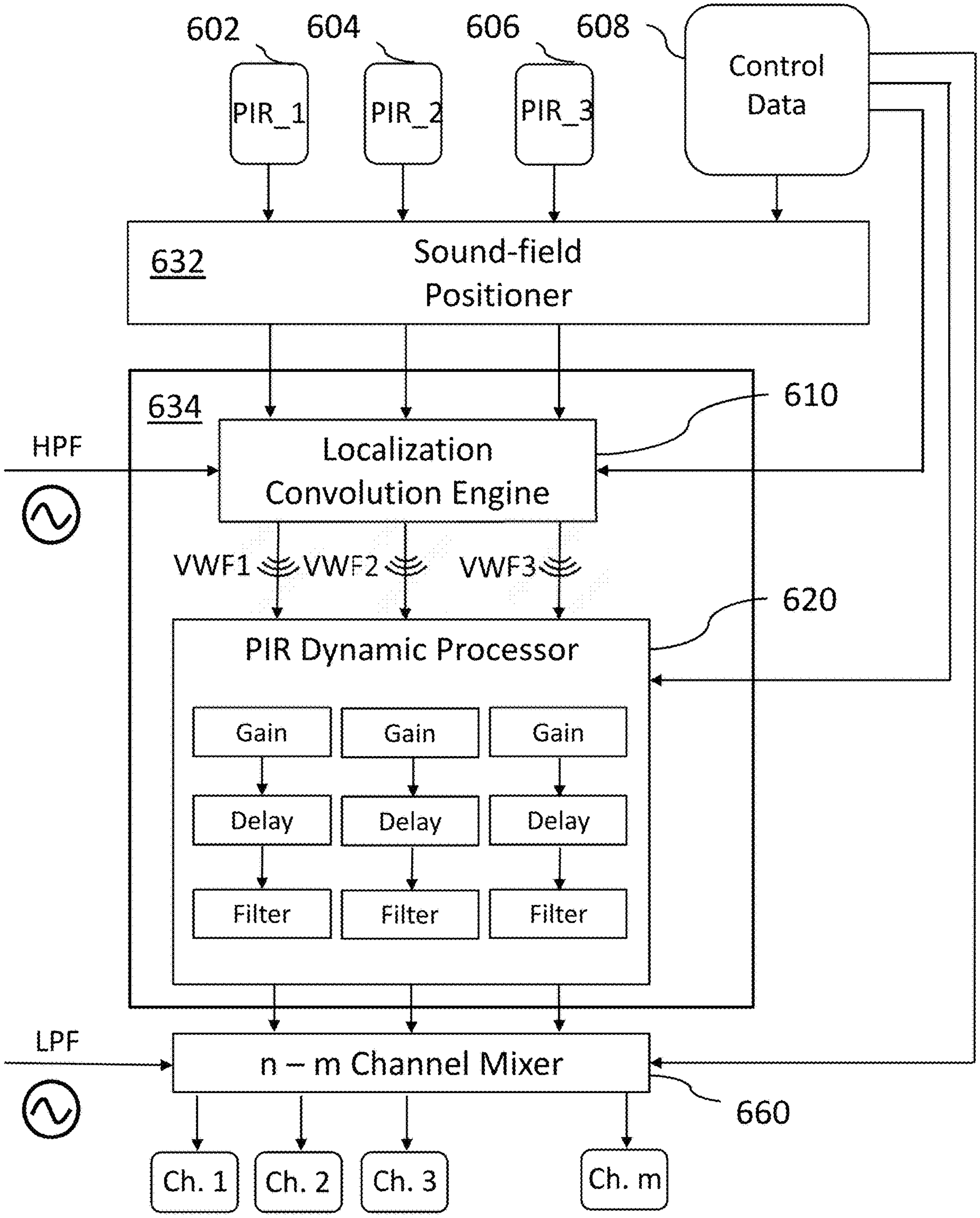
FIG. 6 is a diagram of various components of an audio rendering system in accordance with an embodiment of the present technology.

Turning now to FIG. 6, a sound-field positioner 632, an audio image renderer 634 and a n-m channel mixer 660 are illustrated. In some embodiments, the sound-field positioner 632 may be similar to the sound-field positioner 532, the audio image renderer 634 may be similar to the audio image renderer 534 and the n-m channel mixer 660 may be similar to the n-m channel mixer 510. In the illustrated embodiments, the audio image renderer 634 comprises a localisation convolution engine 610 and a positional impulse response (PIR) dynamic processor 620. In the illustrated embodiment, the sound-field positioner 632 accesses a first positional impulse response (PIR_1) 602, a second positional impulse response (PIR_2) 604 and a third positional impulse response (PIR_3) 606. The sound-field positioner 632 also accesses control data 608. In the illustrated embodiment, the control data 608 are also accessed by the audio image renderer 634 so that the control data may be relied upon by the localization convolution engine 610 and the PIR dynamic processor 620. The control data 608 are also accessed by the n-m channel mixer 660. As it may be appreciated, in such embodiments, the control data 608 may comprise instructions and/or data relating to configuration of the sound-field positioner 632 (e.g., positions associated or to be associated with the PIR_1 602, the PIR_2 604 and/or the PIR_3 606), the localization convolution engine 610, the PIR dynamic processor 620 and/or the n-m channel mixer 660.

In the embodiment illustrated at FIG. 6, the localization convolution engine 610 is being inputted with an audio stream, the control data 608, the PIR_1 602, the PIR_2 604 and the PIR_3 606. In the illustrated embodiment, the audio stream inputted to the localization convolution engine 610 is a filtered audio stream, in this example an audio stream filtered with a high-pass filter. In some alternative embodiments, the audio stream inputted to the localization convolution engine 610 is a non-filtered audio stream. The localization convolution engine 610 allows generating a first virtual wave front (VWF1) based on the audio stream and the PIR_1 602, a second virtual wave front (VWF2) based on the audio stream and the PIR_2 604 and a third virtual wave front (VWF3) based on the audio stream and the PIR_3 606. In the illustrated embodiment, generating the VWF1 comprises convolving the audio stream with the PIR_1 602, generating the VWF2 comprises convolving the audio stream with the PIR_2 604 and generating the VWF3 comprises convolving the audio stream with the PIR_3 606. In some embodiments, the convolution is based on a Fourier-transform algorithm such as, but not limited to, the fast Fourier-transform (FFT) algorithm. Other examples of algorithms to conduct a convolution may also be envisioned without departing from the scope of the present technology. In some embodiments, generating the VWF1, the VWF2 and the VWF3 is executed by the localization convolution engine 610 in parallel and synchronously so as to define an audio image for being rendered to a listener. In the illustrated embodiment, the VWF1, the VWF2 and the VWF3 are further processed in parallel by the PIR dynamic processor 620 by applying to each one of the VWF1, the VWF2 and the VWF3 a gain filter, a delay filter and additional filtering (e.g., a filtering conducted by an equalizer). The filtered VWF1, VWF2 and VWF3 are then inputted to the n-m channel mixer 660 to be mixed to generate multiple channels, namely Ch. 1, Ch. 2, Ch. 3 and Ch. m. In the illustrated embodiments, the filtered VWF1, VWF2 and VWF3 are being mixed with the audio stream on which a low-pass filter has been applied. As previously detailed above, in some embodiments, the audio stream may not need to be filtered prior before being inputted to the audio image renderer 634. As a result, in such embodiments, the VWF1, the VWF2 and the VWF3 may be mixed together by n-m channel mixer 660 without requiring inputting the audio stream on which a low-pass filter has been applied to the n-m channel mixer 660. In addition, in some embodiments, the n-m channel mixer 660 may solely output two channels, for examples for cases where the audio image is to be rendered on headphones. Many variations may therefore be envisioned without departing from the scope of the present technology.

Figure 7:
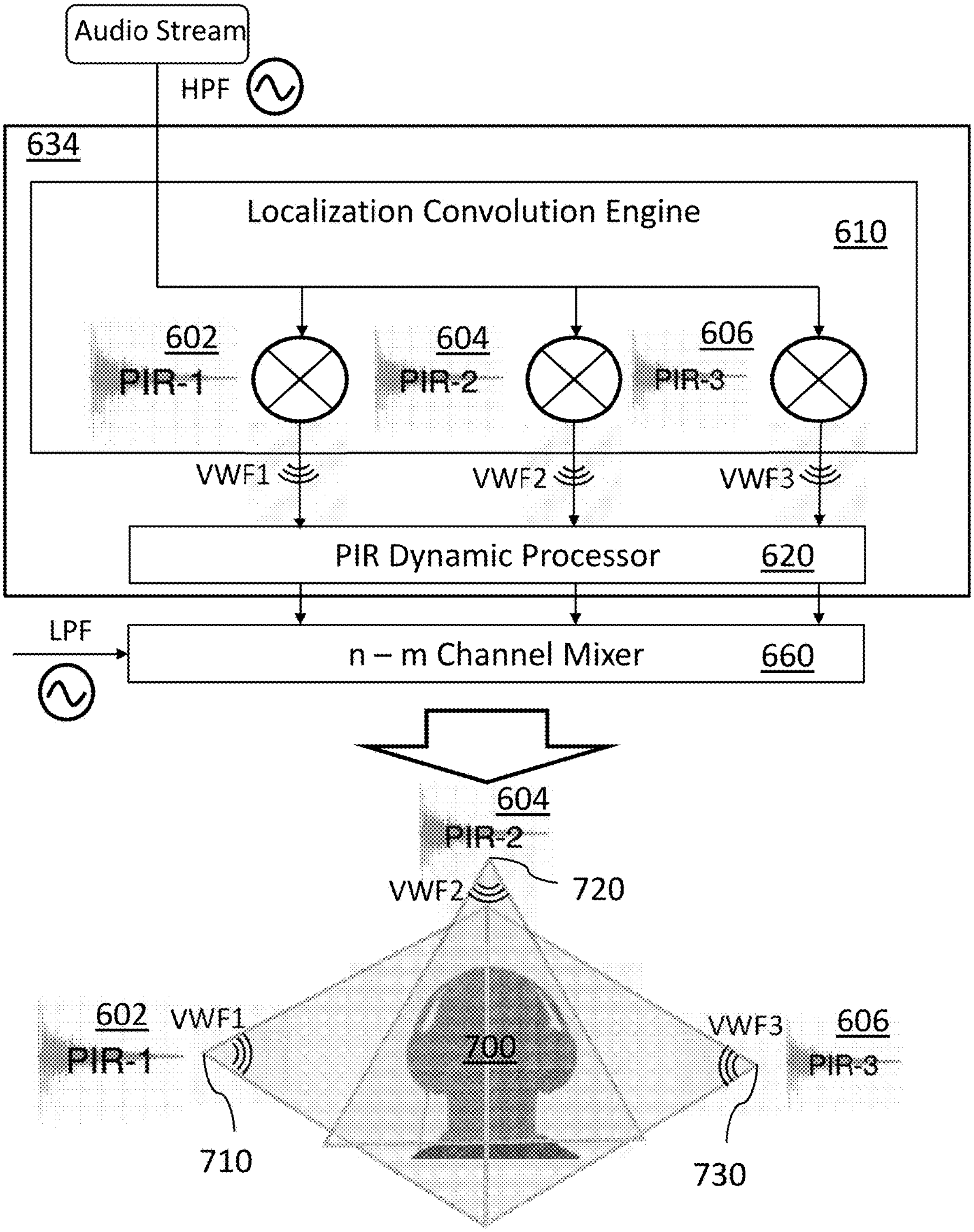
FIG. 7 is a diagram of various components of an audio rendering system rendering an audio image in accordance with an embodiment of the present technology.

FIG. 7 depicts an audio image 700 being rendered by the audio image renderer 634 and the n-m channel mixer 660 of FIG. 6. As previously detailed above in connection with the description of FIG. 6, the localization convolution engine 610 of the audio image renderer 634 executes in parallel a convolution of the audio stream with the PIR_1 602 to generate the VWF1, a convolution of the audio stream with the PIR_2 604 to generate the VWF2 and a convolution of the audio stream with the PIR_3 606. As can be seen in FIG. 7, the VWF1 is perceived by the listener as emanating from a first position 710, the VWF2 is perceived by the listener as emanating from a second position 720 and the VWF3 is perceived by the listener as emanating from a third position 730. In some embodiments, the first position 710 is associated with the PIR_1 602. The second position 720 is associated with the PIR_2 604. The third position 730 is associated with the PIR_3 606. The first position 710, the second position 720 and/or the third position 730 may be determined and/or controlled by a sound-field positioner (e.g., the sound-field positioner 632) and may be based, but not necessarily, on control data (e.g., the control data 608).

As it may be appreciated in FIG. 7, the audio image 700 is defined by the combination of the VWF1, the VWF2 and the VWF3. The audio image 700, upon being rendered to the listener, may therefore be perceived by the listener as an immersive audio volume, similar to what the listener would experience in real life. In some embodiments, the immersive audio volume may be referred to as a virtual immersive audio volume as the audio image allows to "virtually" recreates a real-life experience. In some embodiments, the audio image may be referred to as a 3D experiential audio image.

Figure 8:
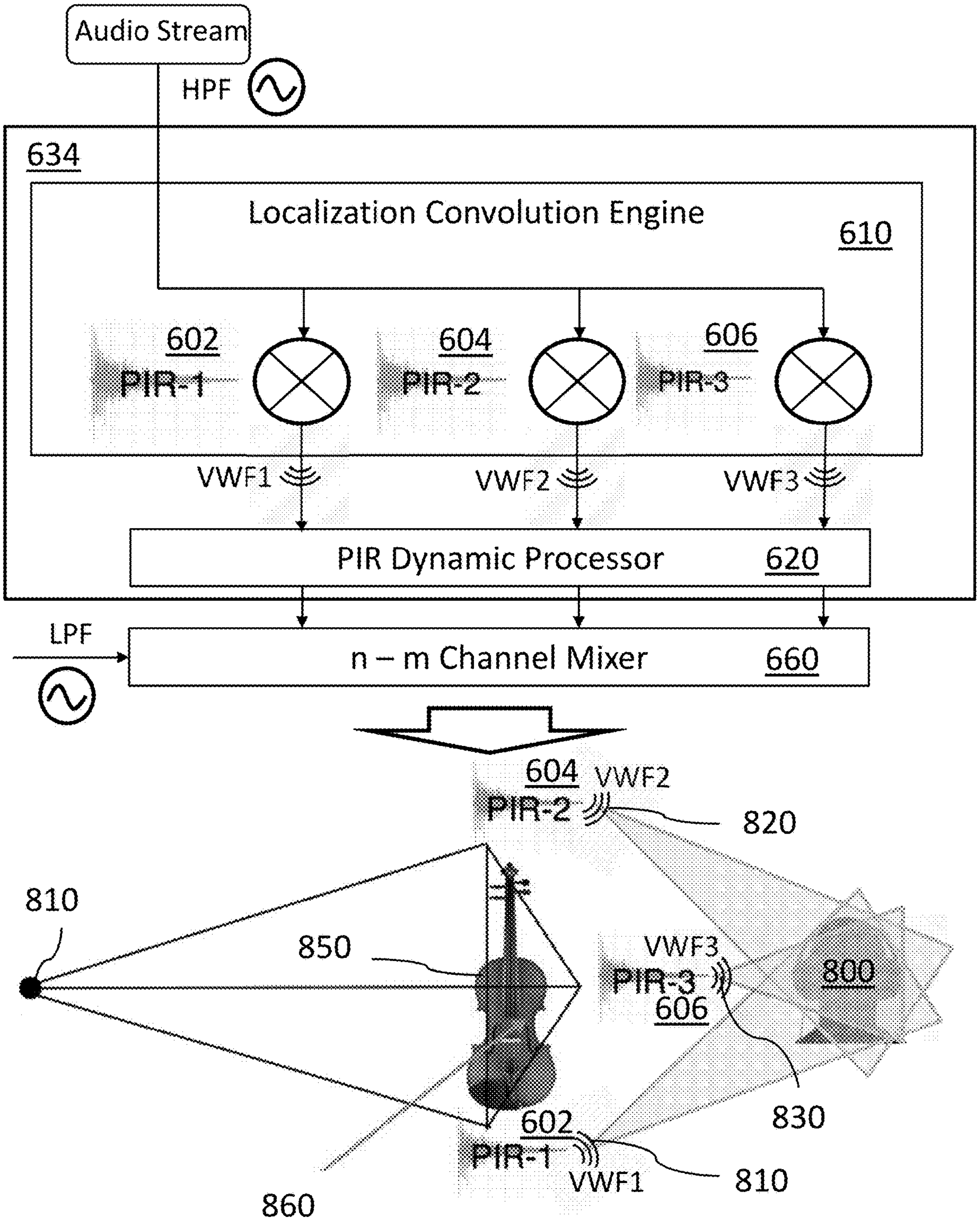
FIG. 8 is a diagram of various components of an audio rendering system rendering another audio image in accordance with an embodiment of the present technology.

FIG. 8 illustrates an example of how the audio image renderer may be used as an image expansion tool. In this example, the audio stream comprises a mono-source audio object 810. In some embodiments, the mono-source audio object 810 may also be referred to as a point-source audio object. In this embodiment, the mono-source audio object 810 is a one-channel recording of a violin 850. In this example, the audio stream is processed to generate the VWF1, the VWF2 and the VWF3 which are positioned at a first position 810, a second position 820 and a third position 830. The first position 810, the second position 820 and the third position 830 define a polygon section of acoustic space 860 allowing the one-channel recording of the violin 850 to be expanded so as to be perceived by the listener as a volumetric audio image 800 of the violin 850. As a result, the violin 850 recorded on a one-channel recording may be expanded by the audio image renderer 634 so to as to be perceived in a similar way that it would have been perceived in real life if the violin 850 were being played next to the listener. In the illustrated example, the volumetric audio image 800 is defined by the combination of the VWF1, the VWF2 and the VWF3. In some embodiments, the volumetric audio image 800 may also be referred to as a 3D experiential audio object.

Figure 9:
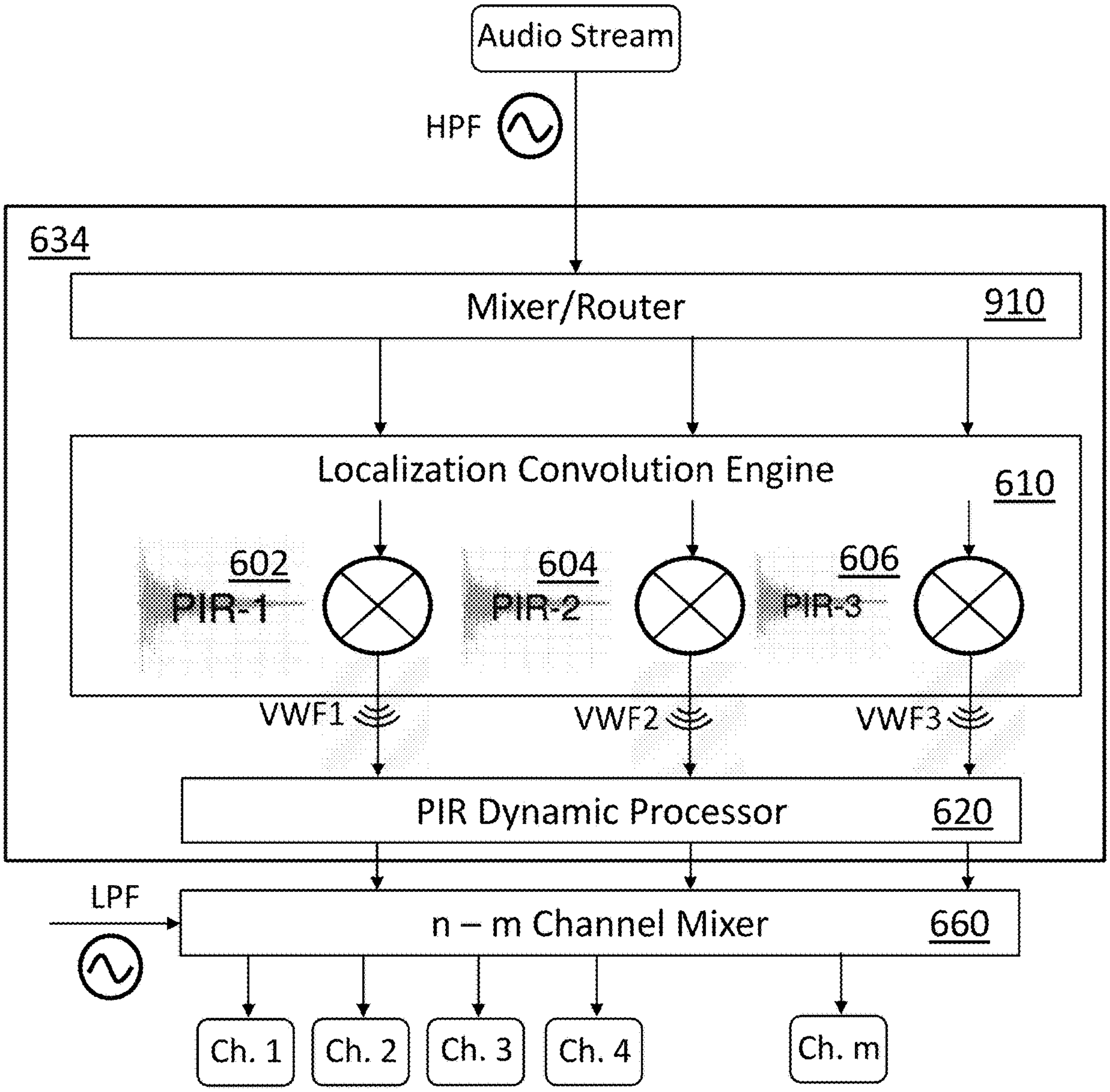
FIG. 9 is a diagram of an embodiment of an audio image renderer in accordance with the present technology.

FIG. 9 illustrates an embodiment of the audio image renderer 634 further comprising a mixer/router 910. In this embodiment, the mixer/router 910 allows duplicating and/or merging audio channels so that the localization convolution engine 610 is being inputted with the appropriate number of channels. In some embodiments, the mixer/router 910 may be two different modules (i.e. a mixer component and a router component). In some embodiments, the mixer component and the router component are combined into a single component.

As an example, the audio stream may be a one-channel stream which is then duplicated into three signals so that each one of the three signals may be convolved with each one of the PIR_1 602, the PIR_2 604 and the PIR_3 606. As it may be appreciated on FIG. 9, the n-m channel mixer 660 outputs multiple channels, namely Ch. 1, Ch. 2, Ch. 3, Ch. 4 and Ch. m. In some embodiments, wherein the n-m channel mixer 660 outputs three channels (e.g., Ch. 1, Ch. 2 and Ch. 3), each one of the three channels may be associated with a different one of the VWF1, the VWF2 and the VWF3. In some alternative embodiments, the VWF1, the VWF2 and the VWF3 may be mixed by the n-m channel mixer 660 before outputting the three channels. In yet some other embodiments, more than three virtual wave fronts may be generated in which case the n-m channel mixer 660 may process the more than three virtual wave fronts and output a number of channels which is less than a number of virtual wave fronts generated by the localization convolution engine 610. Conversely, a number of virtual wave fronts generated by the localization convolution engine 610 may be less than a number of channels outputted by the n-m channel mixer 660. Multiple variations may therefore be envisioned without departing from the scope of the present technology.

Figure 10:
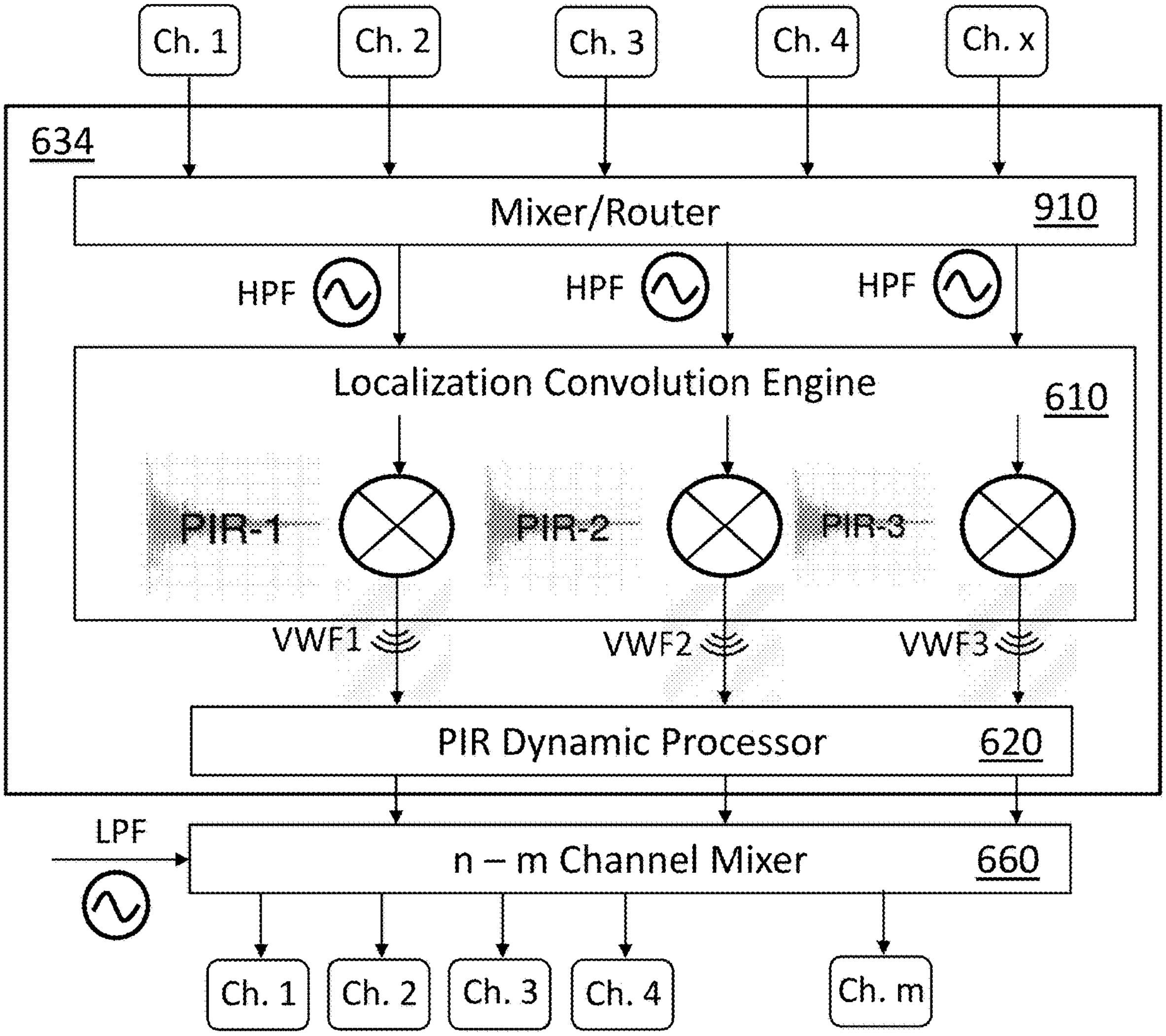
FIG. 10 is a diagram of another embodiment of an audio image renderer in accordance with the present technology.

FIG. 10 illustrates an embodiment wherein the audio stream comprises multiple channels, namely Ch. 1, Ch. 2, Ch. 3, Ch. 4 and Ch. x. In this example, the multiple channels are mixed by the mixer/router 910 so as to generate an appropriate number of signals to be convolved by the localization convolution engine 610. In this example, the mixer/router 910 outputs three signals, each one of the three signals being then convolved by the localization convolution engine 610 with each one of the PIR_1 602, the PIR_2 604 and the PIR_3 606. As it may be appreciated on FIG. 10, the n-m channel mixer 660 outputs multiple channels, namely Ch. 1, Ch. 2, Ch. 3, Ch. 4 and Ch. m.

Figure 11:
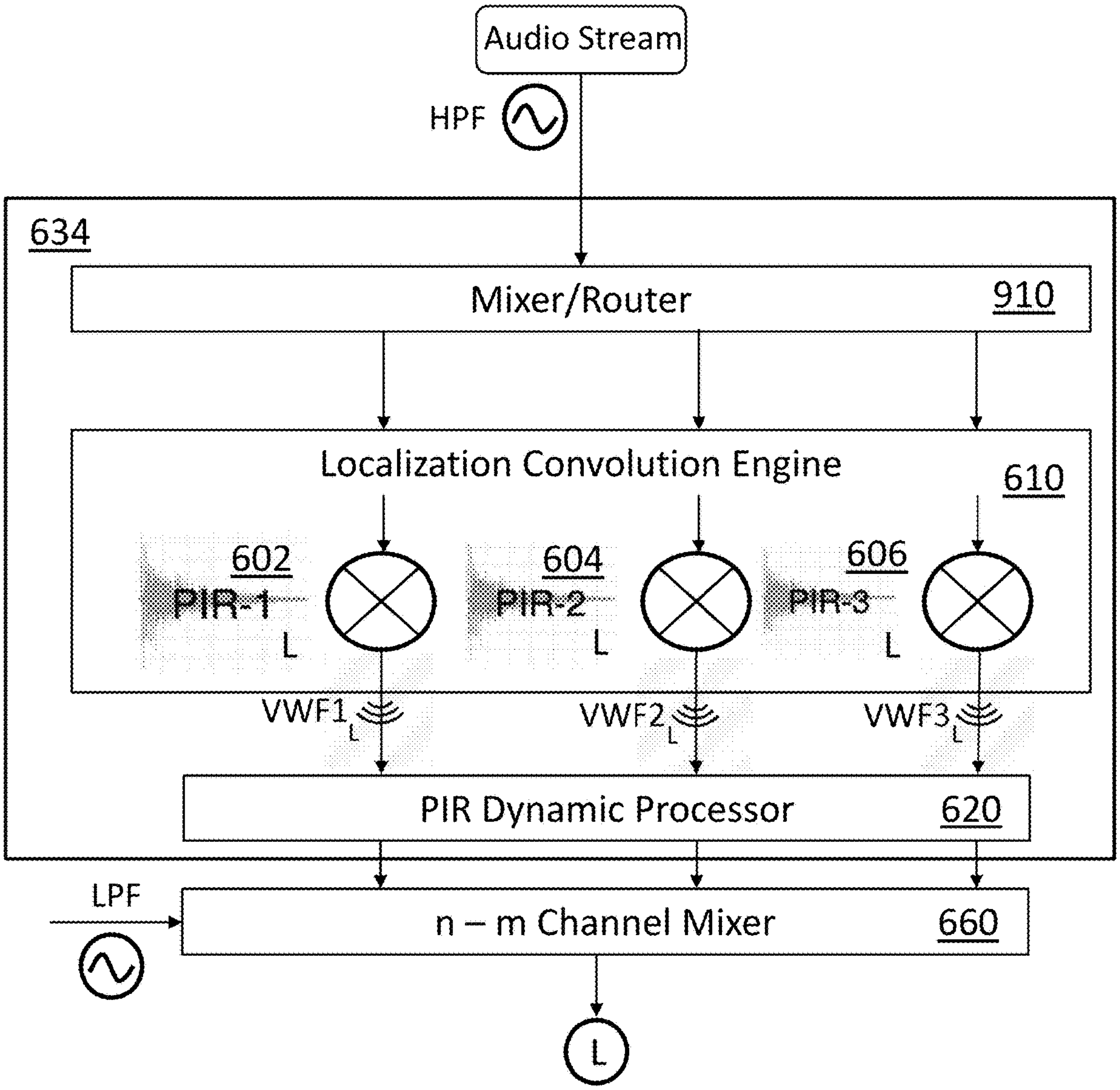
FIGS. 11 and 12 are diagrams of another embodiment of an audio image renderer in accordance with the present technology.
Figure 12:
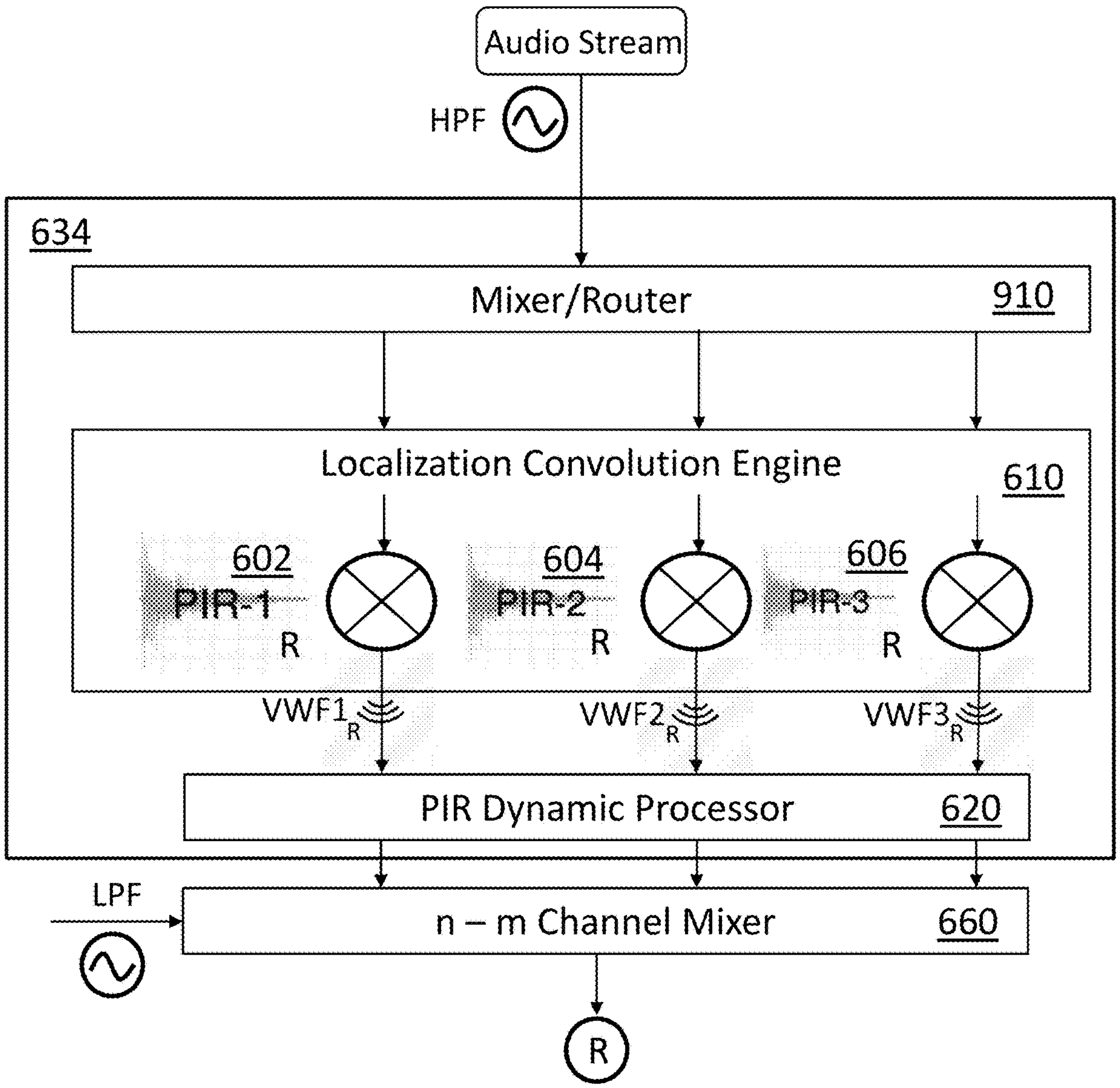

Turning now to FIGS. 11 and 12, an embodiment of the audio image renderer 634 wherein the n-m channel mixer 660 outputs a two-channel signal for being rendered on two speakers, such as, headphones or a loudspeaker set is depicted. In this embodiment, the audio image to be rendered may be referred to as a binaural audio image. In this embodiment, each one of the positional impulse responses comprises a left component and a right component. In this example, the PIR_1 602 comprises a left component PIR_1 L and a right component PIR_1 R, the PIR_2 604 comprises a left component PIR_2 L and a right component PIR_2 R and the PIR_3 606 comprises a left component PIR_3 L and a right component PIR_3 R. In this embodiment, the audio image renderer 634 processes in parallel a left channel and right channel. The audio image renderer 634 generates the left channel by convolving, in parallel, the audio stream with the left component PIR_1 L (also referred to as a first left positional impulse response) to generate a left component of a first virtual wave front VWF1 L, the audio stream with the left component PIR_2 L (also referred to as a second left positional impulse response) to generate a left component of a second virtual wave front VWF2 L and the audio stream with the left component PIR_3 L (also referred to as a third left positional impulse response) to generate a left component of a third virtual wave front VWF3 L.

The audio image renderer 634 generates the right channel by convolving, in parallel, the audio stream with the right component PIR_1 R (also referred to as a first right positional impulse response) to generate a right component of the first virtual wave front VWF1 R, the audio stream with the right component PIR_2 R (also referred to as a second right positional impulse response) to generate a right component of the second virtual wave front VWF2 R and the audio stream with the right component PIR_3 R (also referred to as a third right positional impulse response) to generate a right component of the third virtual wave front VWF3 R.

Then, the n-m channel mixer 660 mixes the VWF1 L, the VWF2 L, the VWF3 L to generate the left channel and mixes the VWF1 R, the VWF2 R and the VWF3 R to generate the right channel. The left channel and the right channel may then be rendered to the listener so that she/he may experience a binaural audio image on a regular stereo setting (such as, headphones or a loudspeaker set).

Figure 13:
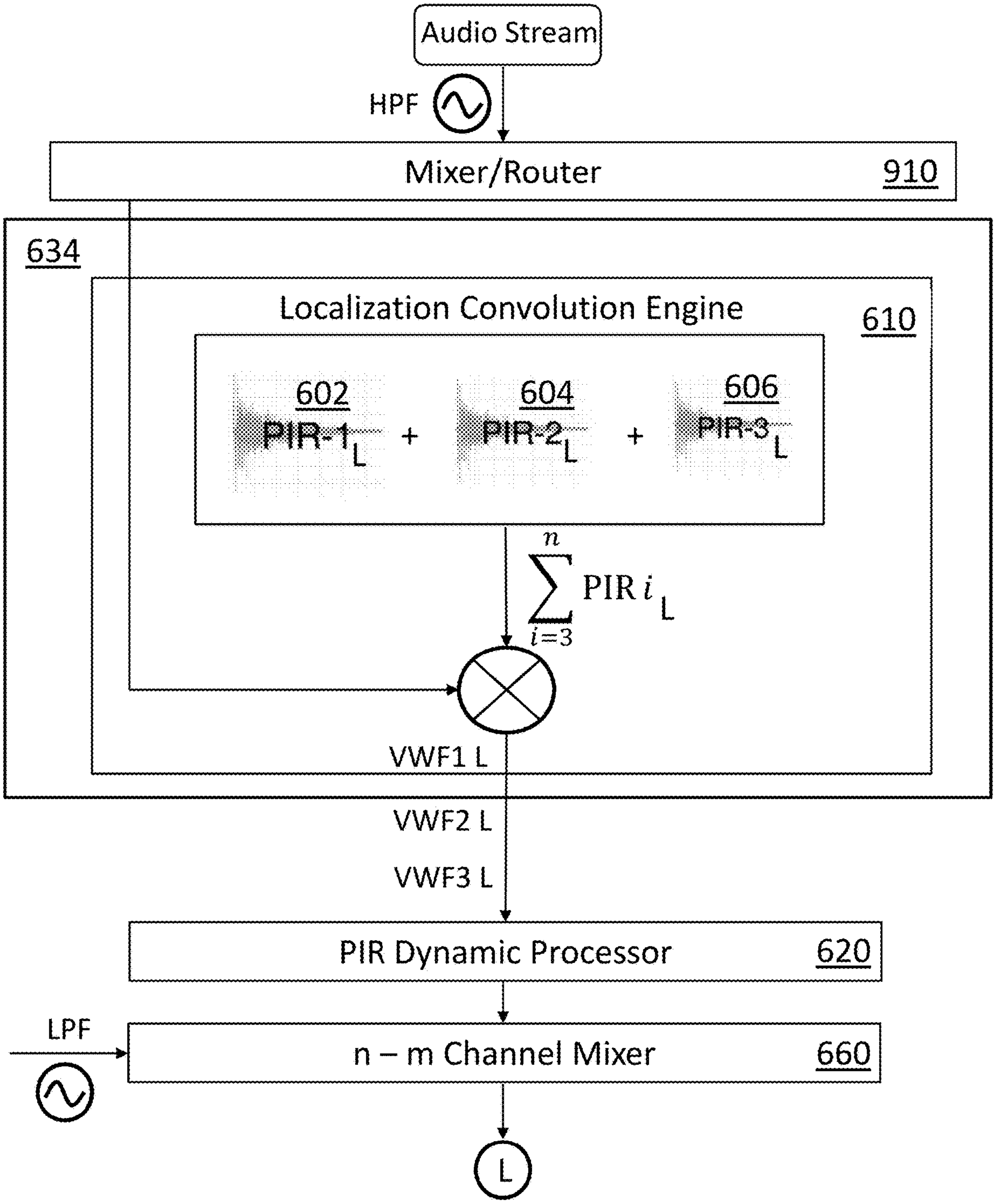
FIGS. 13 and 14 are diagrams of yet another embodiment of an audio image renderer in accordance with the present technology.
Figure 14:
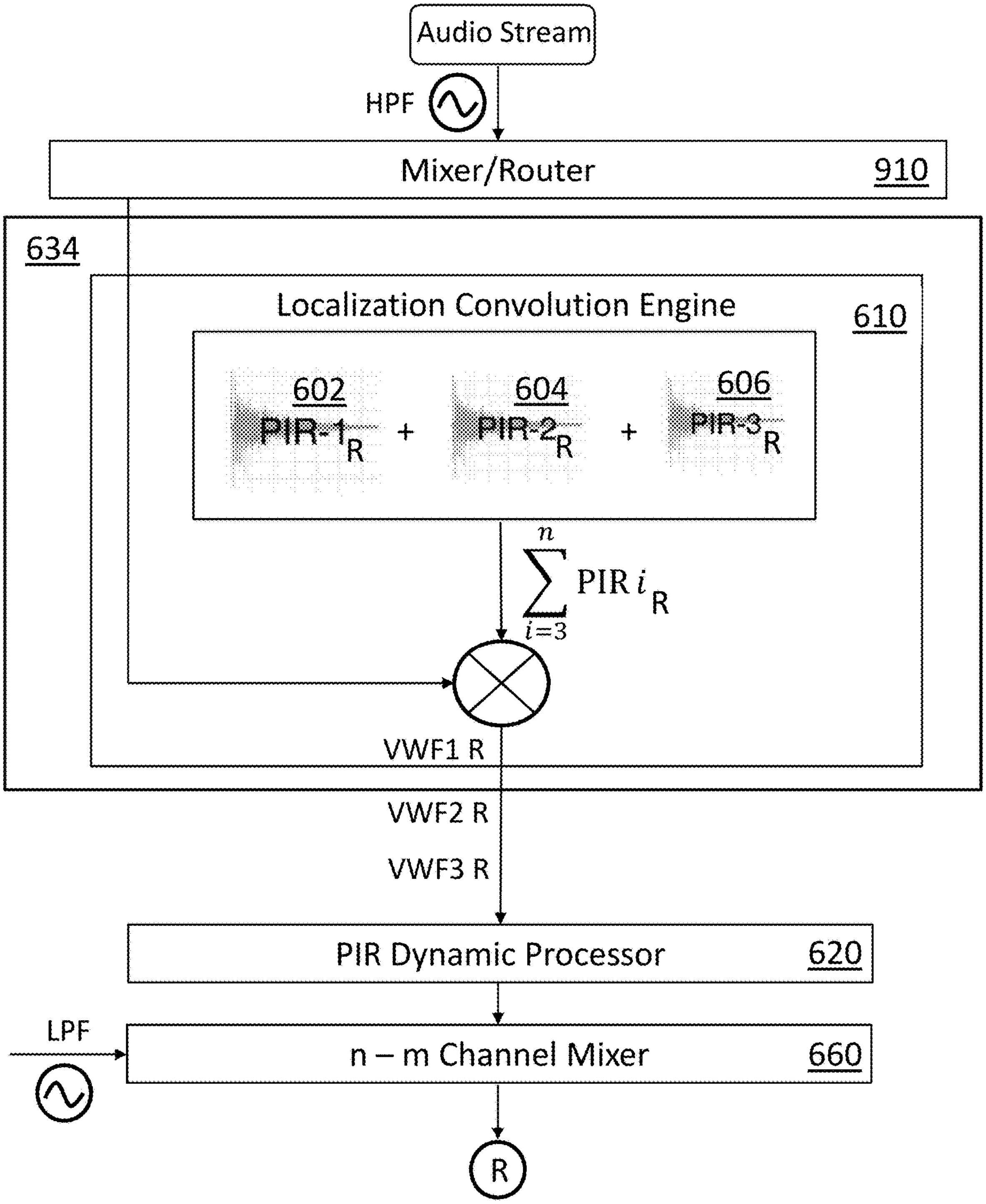

Turning now to FIGS. 13 and 14, an embodiment of the audio image renderer 634 wherein the three convolutions applied to the audio stream for the left channel and the three convolutions applied to the audio stream for the right channel are replaced by a single convolution for the left channel and a single convolution for the right channel. In this embodiment, the left component PIR_1 L, the left component PIR_2 L and the left component PIR_3 L are summed to generate a summed left positional impulse response. In parallel, the right component PIR_1 R, the right component PIR_2 R and the right component PIR_3 R are summed to generate a summed right positional impulse response. Then the localization convolution engine 610 executes, in parallel, convolving the audio stream with the summed left positional impulse response to generate the left channel and convolving the audio stream with the summed right positional impulse response to generate the right channel. In this embodiment, the VWF1 L, the VWF2 L and the VWF3 L are rendered on the left channel and the VWF1 R, the VWF2 R and the VWF3 R are rendered on the right channel so that the listener may perceive the VWF1, the VWF2 and the VWF3. Amongst other benefits, this embodiment may reduce the number of convolutions required to generate the VWF1, the VWF2 and the VWF3 thereby reducing the processing power required from a device on which the audio image renderer 634 operates.

Figure 15:
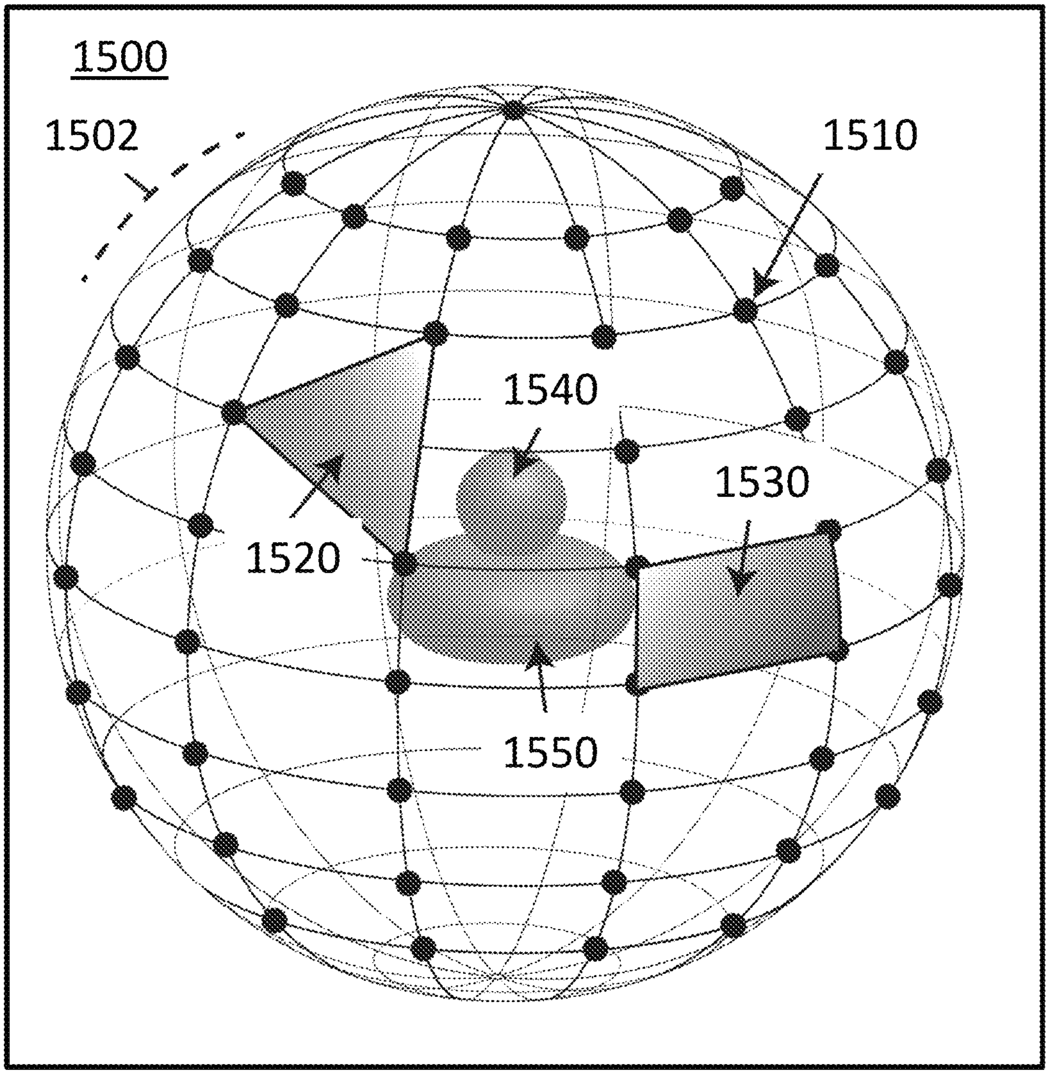
FIG. 15 is a diagram of a three-dimensional space and representation of a virtual wave front in accordance with an embodiment of the present technology.
Figure 15:
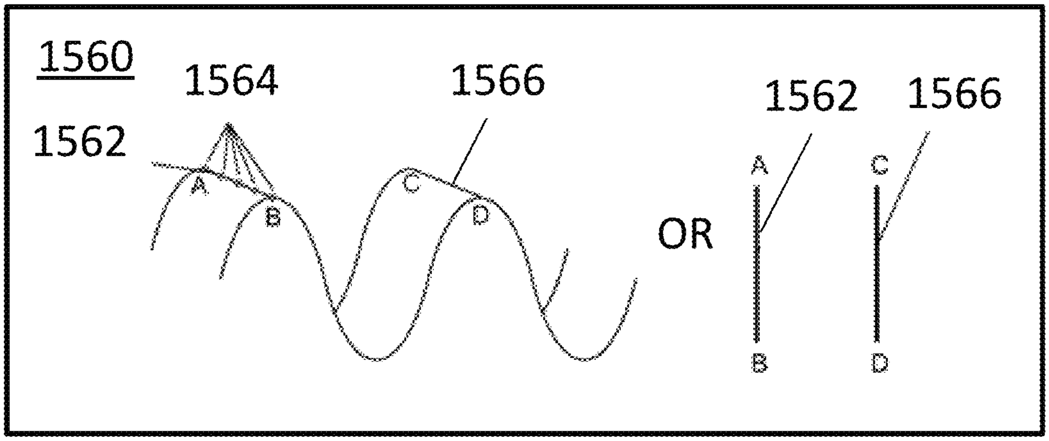

FIG. 15 illustrates another example of a three-dimensional space 1500 and a representation of a virtual wave front 1560. The three-dimensional space 1500 is similar to the three-dimensional space 400 of FIG. 4. The sphere 1500 comprises a mesh defined by multiple positional impulse responses. Each one of the positional impulse responses is represented as a dot on the sphere 1502. An example of such a dot is a dot 1510 representing a positional impulse response 1510 which location on the sphere is determined by a corresponding position. As previously explained, multiple positional impulse responses may be combined together to define a polygonal positional impulse response. Such polygonal positional impulse response is illustrated by a first polygonal positional impulse response 1520 and a second polygonal positional impulse response 1530.

The first polygonal positional impulse response 1520 comprises a first positional impulse response, a second positional impulse response and a third positional impulse response. Each one of the first positional impulse response, the second positional impulse response and the third positional impulse response is associated with a respective position. The combination of all three positions thereby defines the geometry of the first polygonal positional impulse response 1520, in the present case, a triangle. In some embodiments, the geometry may be modified (either in real-time or not) via a controller (e.g., the real-time controller 240).

The second polygonal positional impulse response 1530 comprises a fourth positional impulse response, a fifth positional impulse response, a sixth positional impulse response and a seventh positional impulse response. Each one of the fourth positional impulse response, the fifth positional impulse response, the sixth positional impulse response and the seventh positional impulse response is associated with a respective position. The combination of all four positions thereby defines the geometry of the second polygonal positional impulse response 1530, in the present case, a quadrilateral. In some embodiments, the geometry may be modified (either in real-time or not) via a controller (e.g., the real-time controller 240).

In the illustrated embodiment, a first audio image 1540 is generated based on the first polygonal positional impulse response 1520 (e.g., based on a first audio stream and each one of the positional impulse responses defining the first polygonal positional impulse response 1520). A second audio image 1550 is generated based on the second polygonal positional impulse response 1550 (e.g., based on a second audio stream and each one of the positional impulse responses defining the second polygonal positional impulse response 1530). In some embodiments, the first audio stream and a second audio stream may be a same audio stream.

In some embodiments, the combination of the first audio image 1540 and the second audio image 1550 define a complex audio image. As it may be appreciated, the complex audio image may be morphed dynamically by controlling positions associated with the first polygonal positional impulse response 1520 and the second polygonal positional impulse response 1530. As an example, the first audio image 1540 may be a volumetric audio image of a first instrument (e.g., a violin) and the second audio image 1550 may be a volumetric audio image of a second instrument (e.g., a guitar). Upon being rendered, the first audio image 1540 and the second audio image 1550 are perceived by a listener as not just point-source audio objects but rather as volumetric audio objects, as if the listener was standing by the first instrument and the second instruments in real life. Those examples should not be construed as being limitative and multiple variations and applications may be envisioned without departing from the scope of the present technology.

The representation of a virtual wave front 1560 aims at exemplifying wave fronts of a sound wave. As a person skilled in the art of the present technology may appreciate, the representation 1560 may be taken from a spherical wave front of a sound wave spreading out from a point source. Wave fronts for longitudinal and transverse waves may be surfaces of any configuration depending on the source, the medium and/or obstructions encountered. As illustrated in FIG. 15, a first wave front 1562 extending from point A to point B may comprise a set of points 1564 having a same phase. A second wave front 1566 extends from point C to point D. In some embodiments of the present technology, the virtual wave front may be defined as a perceptual encoding of a wave front. When suitably reproduced (e.g., via headphones or a loudspeaker set), a virtual wave front may be perceived by a listener as a surface representing corresponding points of wave that vibrates in unison. This illustration of a wave front should not be construed as being limitative and multiple variations and applications may be envisioned without departing from the scope of the present technology.

Figure 16:
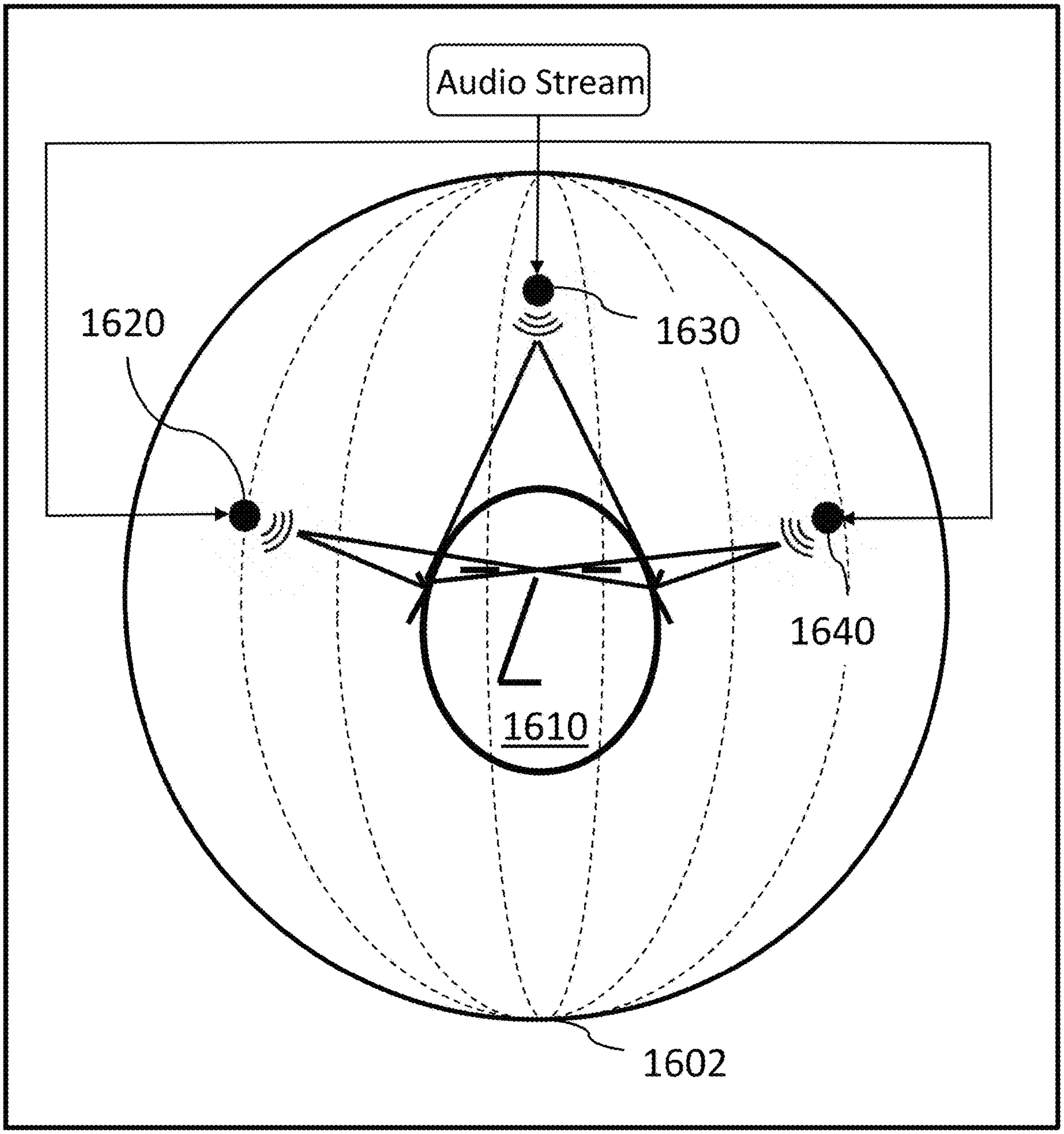
FIGS. 16 to 18 are representations of a listener experiencing an audio image rendered in accordance with the present technology.
Figure 17:
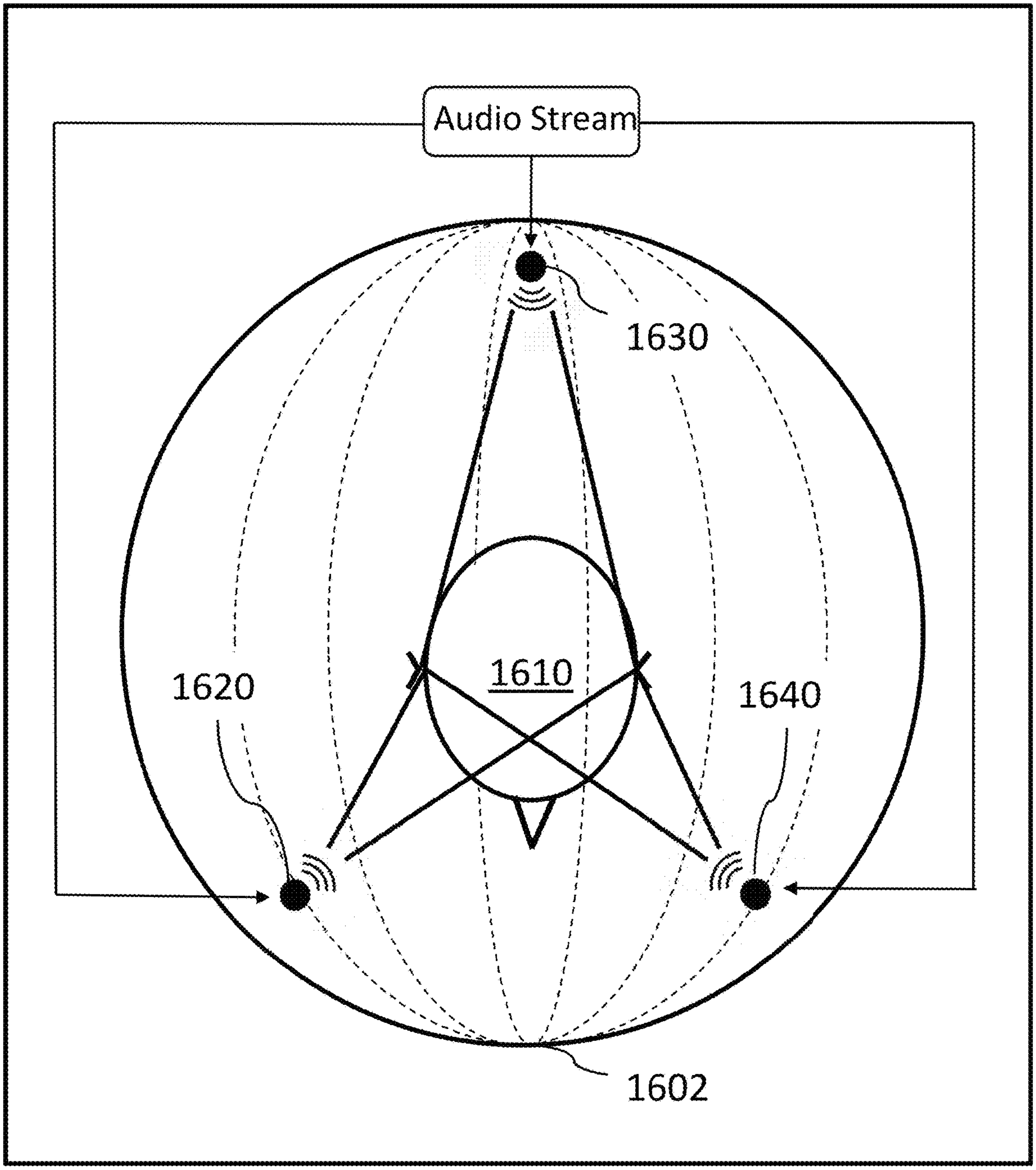

Turning now to FIGS. 16 and 17, a representation of a listener 1610 experiencing an audio image generated in accordance with the present technology based on an audio stream is depicted. As previously detailed, the audio stream is processed by an audio image renderer so as to generate a first virtual wave front perceived by the listener 1610 as emanating from a first position 1620, a second virtual wave front perceived by the listener 1610 as emanating from a second position 1630 and a third virtual wave front perceived by the listener 1610 as emanating from a third position 1640. In some embodiments, the positions from which each of the first virtual wave front, the second virtual wave front and the third wave front may be modified dynamically, for example within a three-dimensional space, for example within a volume defined by a sphere 1602. In some embodiments, the first virtual wave front, the second virtual wave front and the third wave front are perceived by the listener 1610 as being synchronous so that the brain of the listener 1610 may perceive a combination of the first virtual wave front, the second virtual wave front and the third wave front as defining a volumetric audio image, as it would be perceived in real life.

In some embodiments, a volumetric audio image may be perceived by a human auditory system via median and/or lateral information pertaining to the volumetric audio image. In some embodiments, perception in the median plane may be frequency dependent and/or may involve inter-aural level difference (ILD) envelope cues. In some embodiments, lateral perception may be dependent on relative differences of the wave fronts and/or dissimilarities between two ear input signals. Lateral dissimilarities may consist of inter-aural time differences (ITD) and/or inter-aural level differences (ILD). ITDs may be dissimilarities between the two ear input signals related to a time when signals occur or when specific components of the signals occur. These dissimilarities may be described by a frequency plot of inter-aural phase difference b(f). In the perception of ITD envelope cues, timing information may be used for higher frequencies as timing differences in amplitude envelopes may be detected. An ITD envelope cue may be based on extraction by the hearing system of timing differences of onsets of amplitude envelopes instead of timing of waveforms within an envelope. ILDs may be dissimilarities between the two ear input signals related to an average sound pressure level of the two ear input signals. The dissimilarities may be described in terms of differences in amplitude of an inter-aural transfer function $|A(f)|$ and/or a sound pressure level difference $20 \log|A(f)|$.

Figure 18:
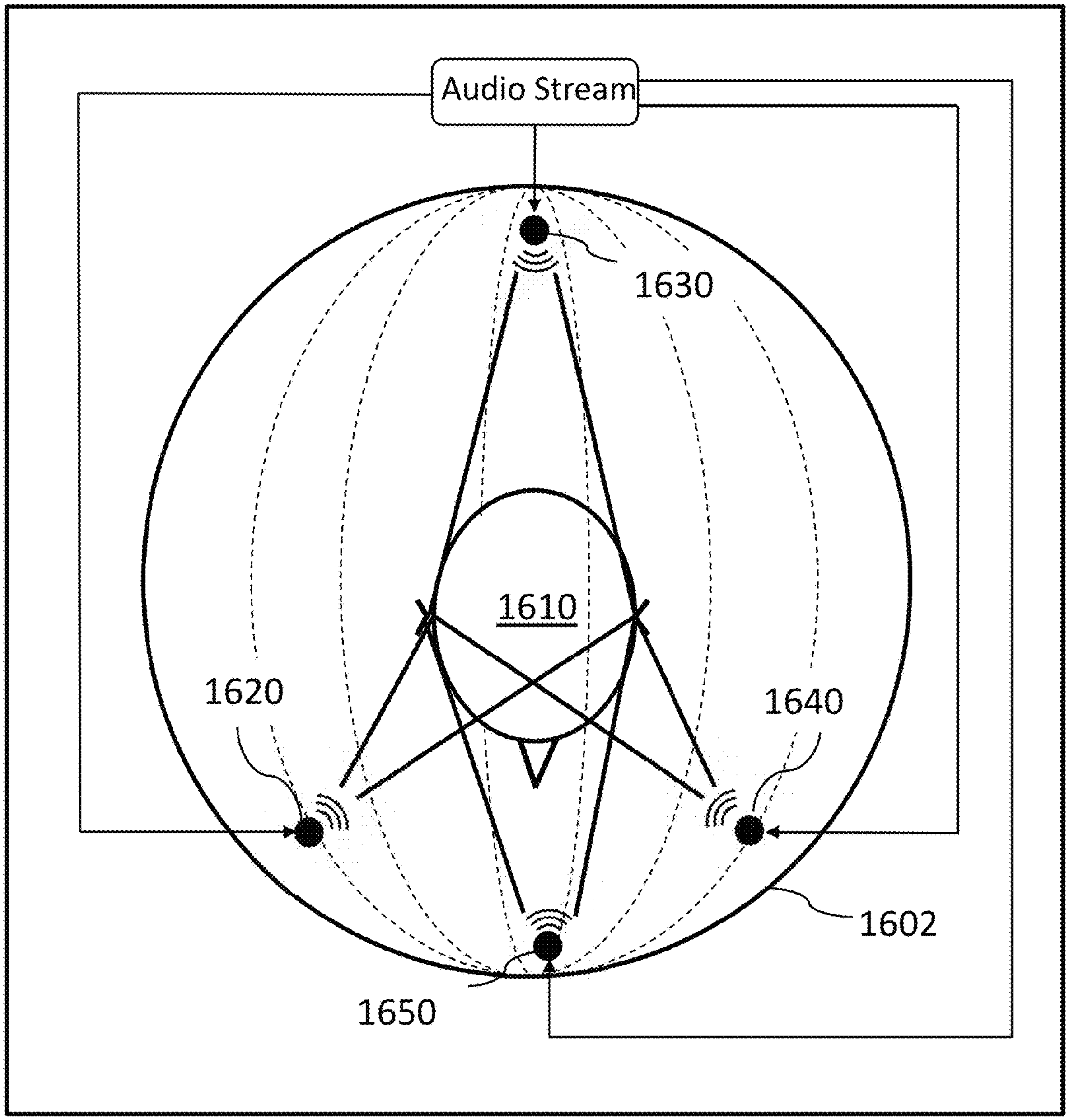

FIG. 18 illustrates an alternative embodiment wherein a fourth virtual wave front is generated by the audio image renderer based on the audio stream so as to be perceived by the listener as emanating from a fourth position 1650. As the person skilled in the art of the present technology may appreciate, more virtual wave fronts may also be generated so as to be perceived as emanating from more distinct positions. As a result, many variations may be envisioned without departing from the scope of the present technology.

Figure 19:
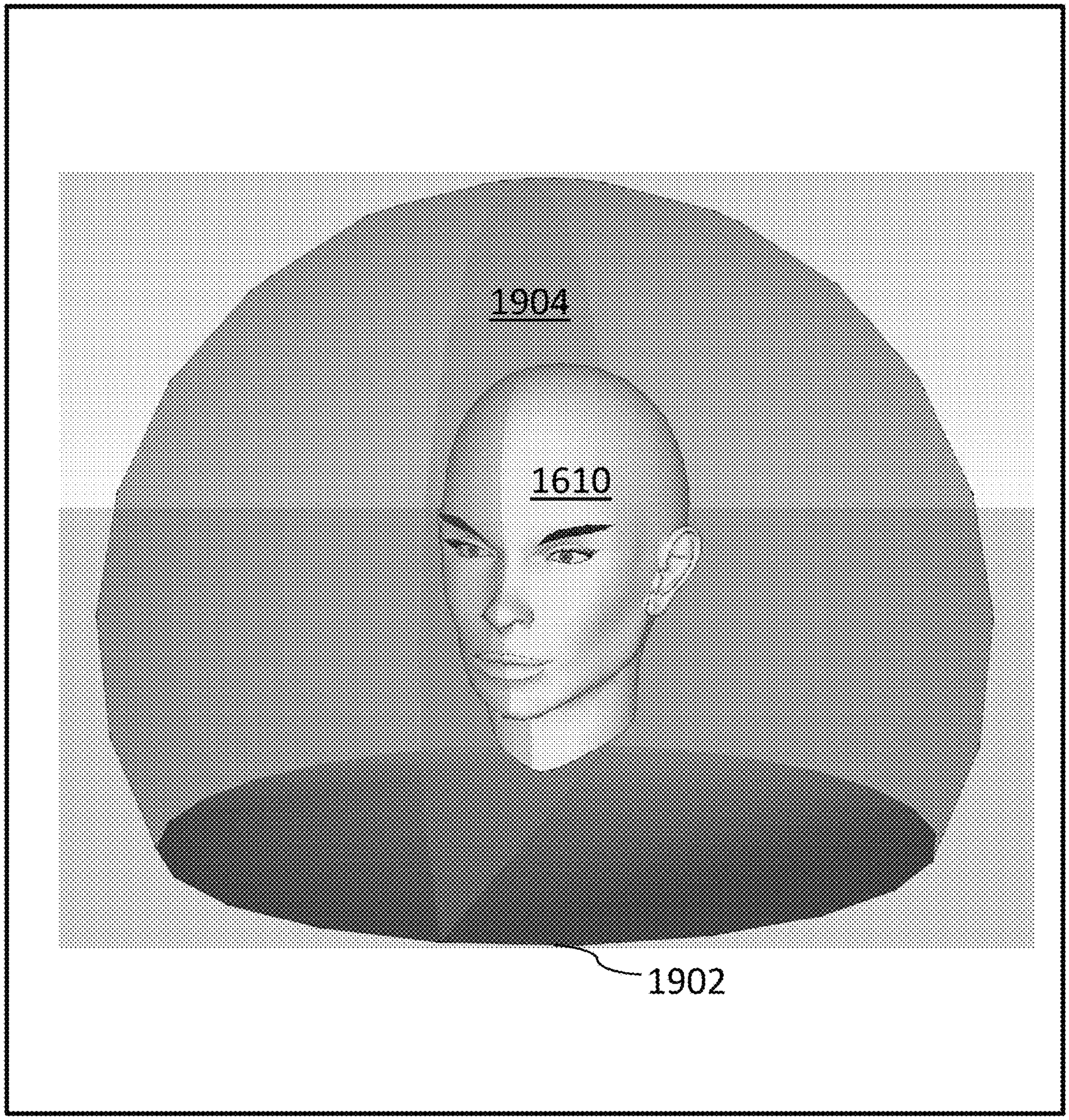
FIGS. 19 to 21 are representations of a listener experiencing audio images rendered in accordance with the present technology.

FIG. 19 illustrates another representation of the listener 1610 of FIGS. 16 to 18 experiencing an audio image generated in accordance with the present technology in a three-dimensional space defined by a portion of a sphere 1902. In FIG. 19, the portion of the sphere 1902 further comprises a plane 1904 extending along a longitudinal axis of the head of the listener 1610.

Figure 20:
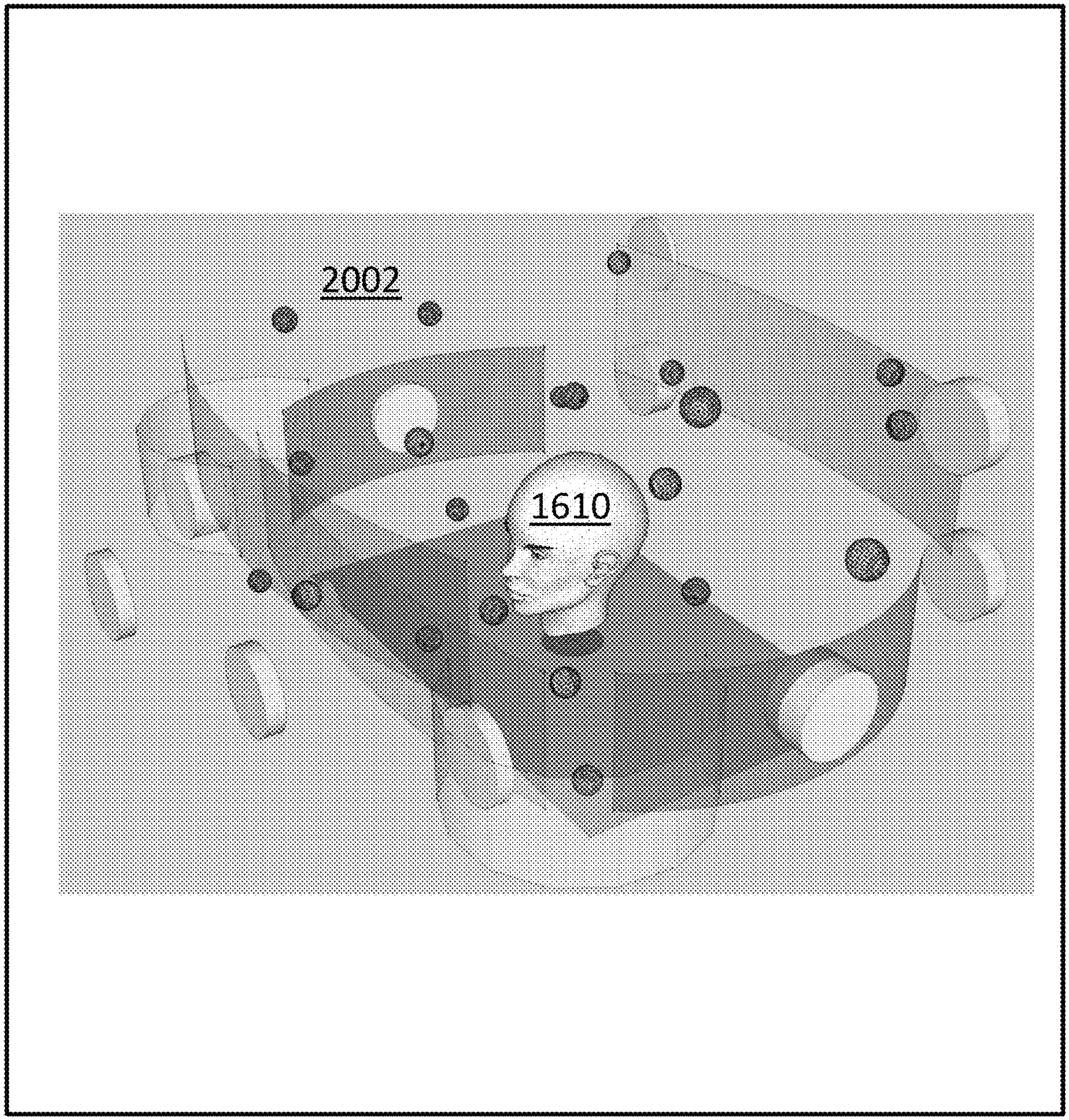

FIG. 20 illustrates another embodiment of the present technology, wherein a complex audio image comprising multiple audio images is generated within a virtual space. In the illustrated embodiment, each one of the geometrical objects (i.e., volumes define by spheres, volumes define by cylinders, curved plane segments) represents a distinct audio image which may be generated in accordance with the present technology. As previously discussed, multiple point source audio objects associated with audio streams may be used to generate audio images which may be positioned within the virtual space to define the complex audio image.

Figure 21:
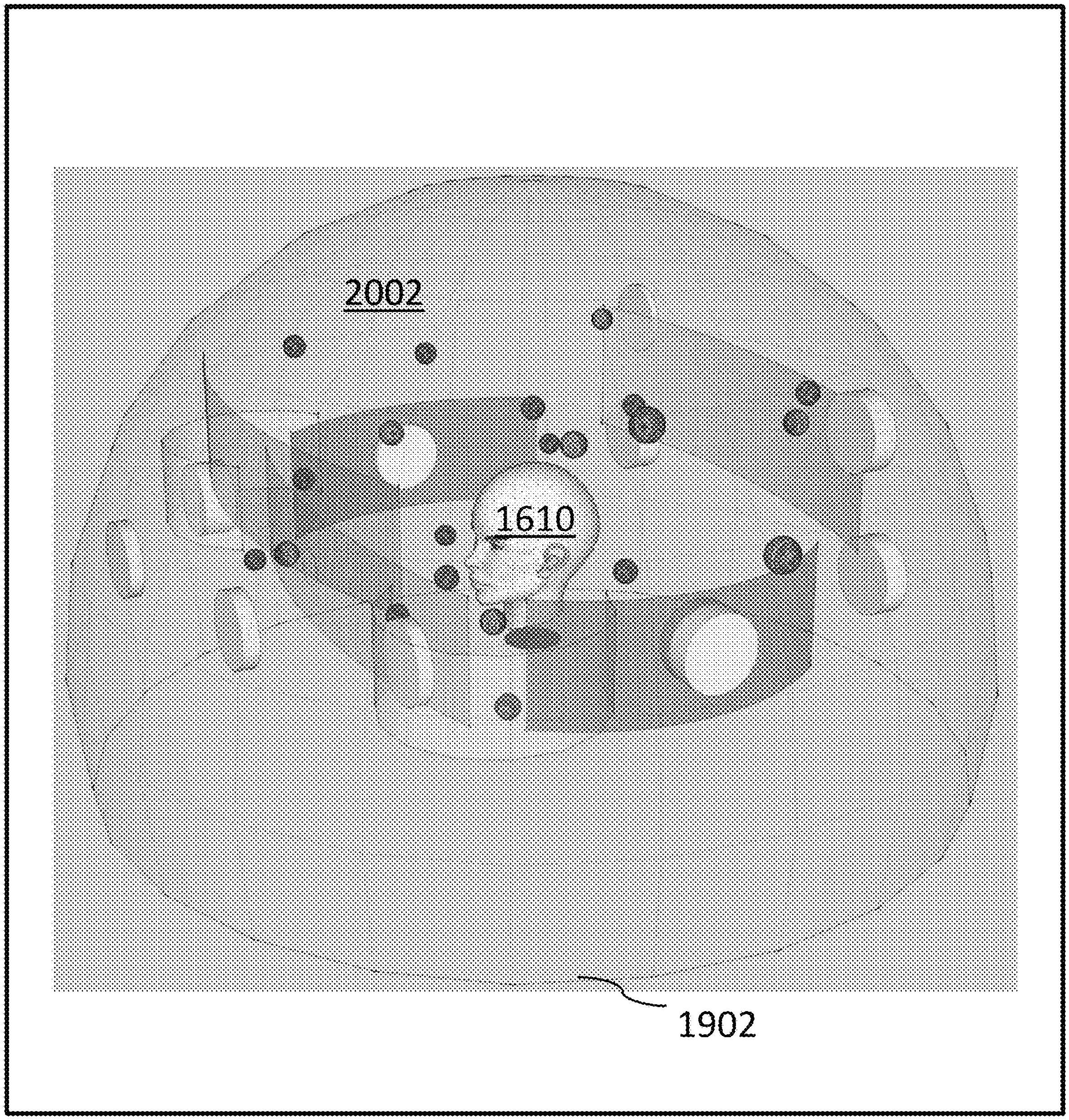

FIG. 21 illustrates the embodiment of FIG. 20 wherein the virtual space is defined by the portion of the sphere 1902 of FIG. 19.

Figure 22:
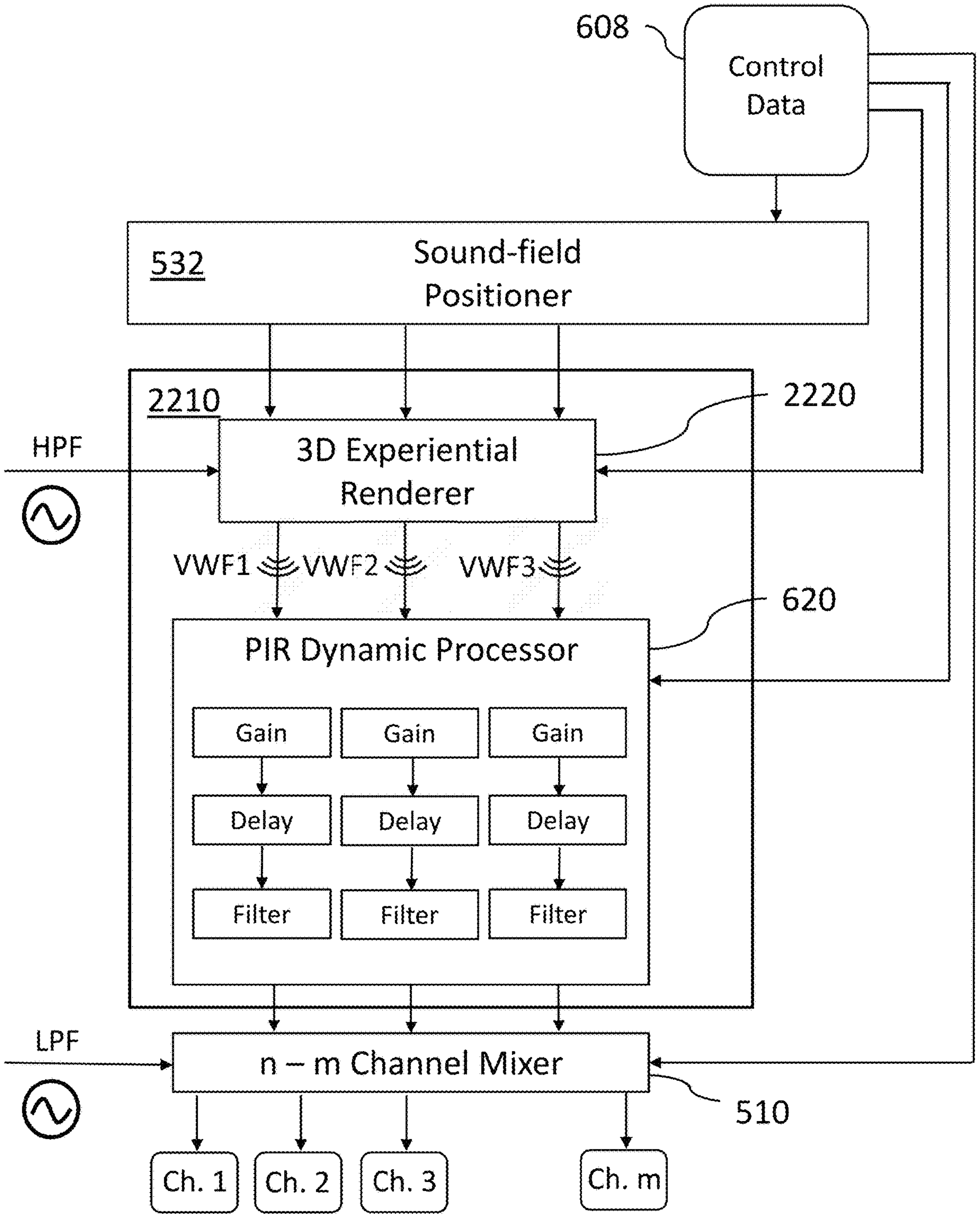
FIG. 22 is a diagram of another embodiment of an audio image renderer in accordance with the present technology.

FIG. 22 illustrates alternative embodiments of the present technology wherein an audio image renderer 2210 comprises a 3D experiential renderer 2220. In some embodiments, the 3D experiential renderer 2220 allows generating, based on the audio stream (which may be filtered or non-filtered), a first virtual wave front to be perceived by a listener as emanating from the first position, a second virtual wave front to be perceived by the listener as emanating from the second position and a third virtual wave front to be perceived by the listener as emanating from the third position. In some embodiments, 3D experiential renderer 2220 comprises an acoustic renderer and/or a binaural renderer (which may also be referred to as a perceptual renderer).

In some embodiments, the acoustic renderer comprises a direct sound renderer, an early reflections renderer and/or a late reflections renderer. In some embodiments, the acoustic renderer is based on binaural room simulation, acoustic rendering based on DSP algorithm, acoustic rendering based on impulse response, acoustic rendering based on B-Format, acoustic rendering based on spherical harmonics, acoustic rendering based on environmental context simulation, acoustic rendering based on convolution with impulse response, acoustic rendering based on convolution with impulse response and HRTF processing, acoustic rendering based on auralization, acoustic rendering based on synthetic room impulse response, acoustic rendering based on ambisonics and binaural rendering, acoustic rendering based on high order ambisonics (HOA) and binaural rendering, acoustic rendering based on ray tracing and/or acoustic rendering based on image modeling.

In some embodiments, the binaural renderer is based on binaural signal processing, binaural rendering based on HRTF modeling, binaural rendering based on HRTF measurements, binaural rendering based on DSP algorithm, binaural rendering based on impulse response, binaural rendering based on digital filters for HRTF and/or binaural rendering based on calculation of HRTF sets.

As for the embodiment depicted in FIG. 6, the first virtual wave front (VWF1), the second virtual wave front (VWF2) and the third virtual wave front (VWF3) may then be processed by the PIR dynamic processor 620 and then mixed by the n-m channel mixer 510 to generate multiple channels so as to render an audio image to the listener.

Figure 23:
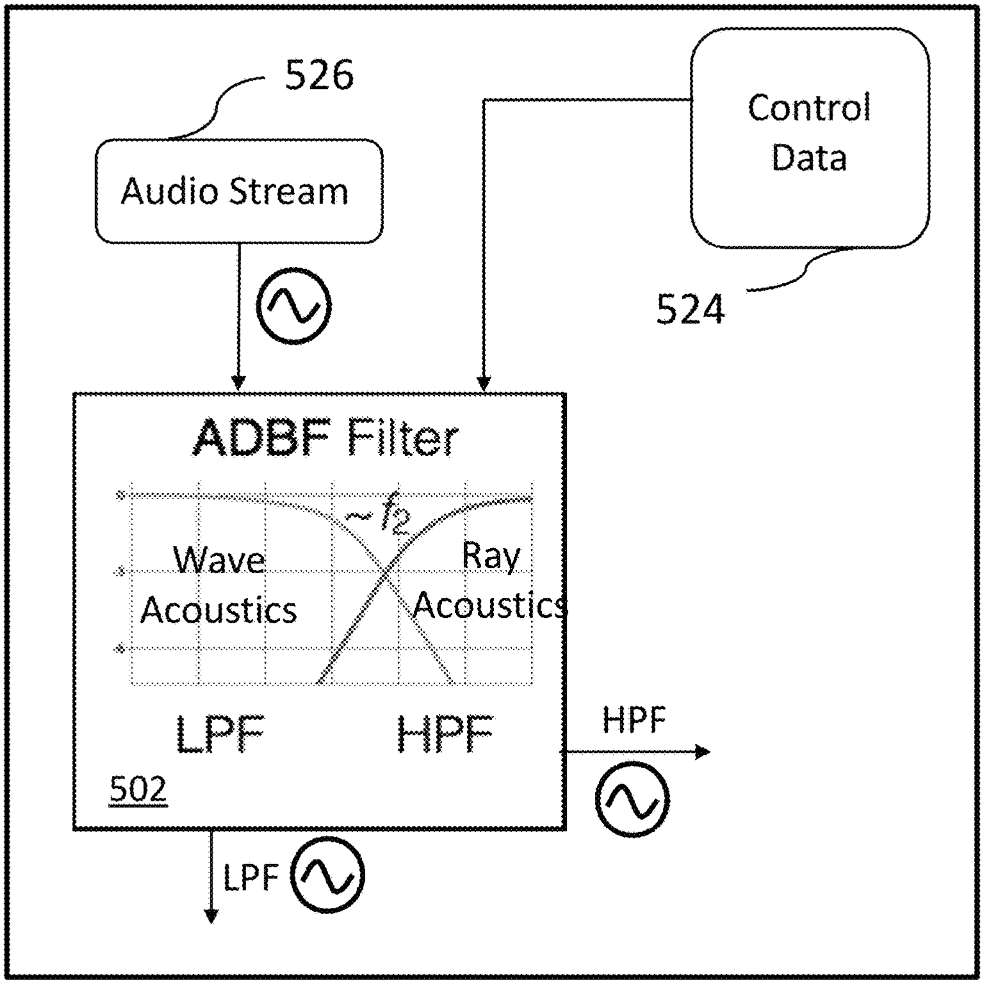
FIGS. 23 and 24 are diagrams of an audio filter and information relating to the audio filter in accordance with an embodiment of the present technology.
Figure 23:
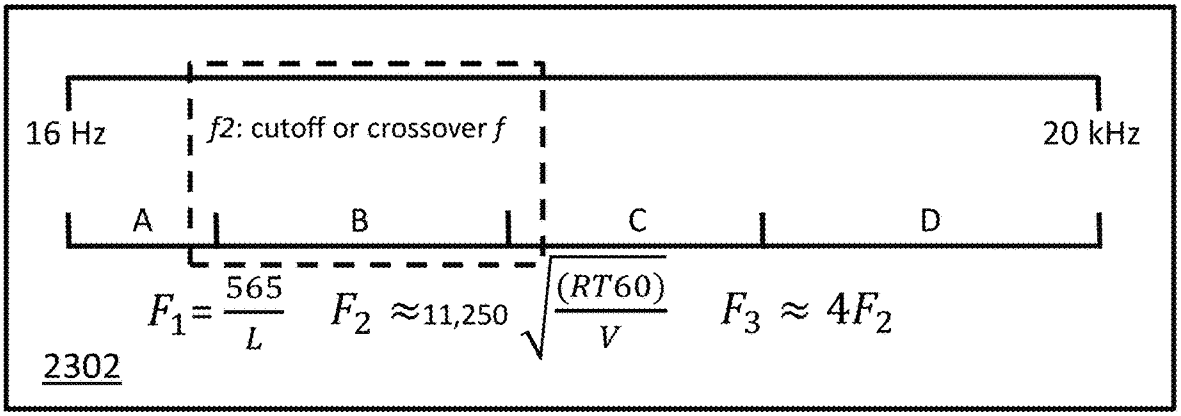
Figure 24:
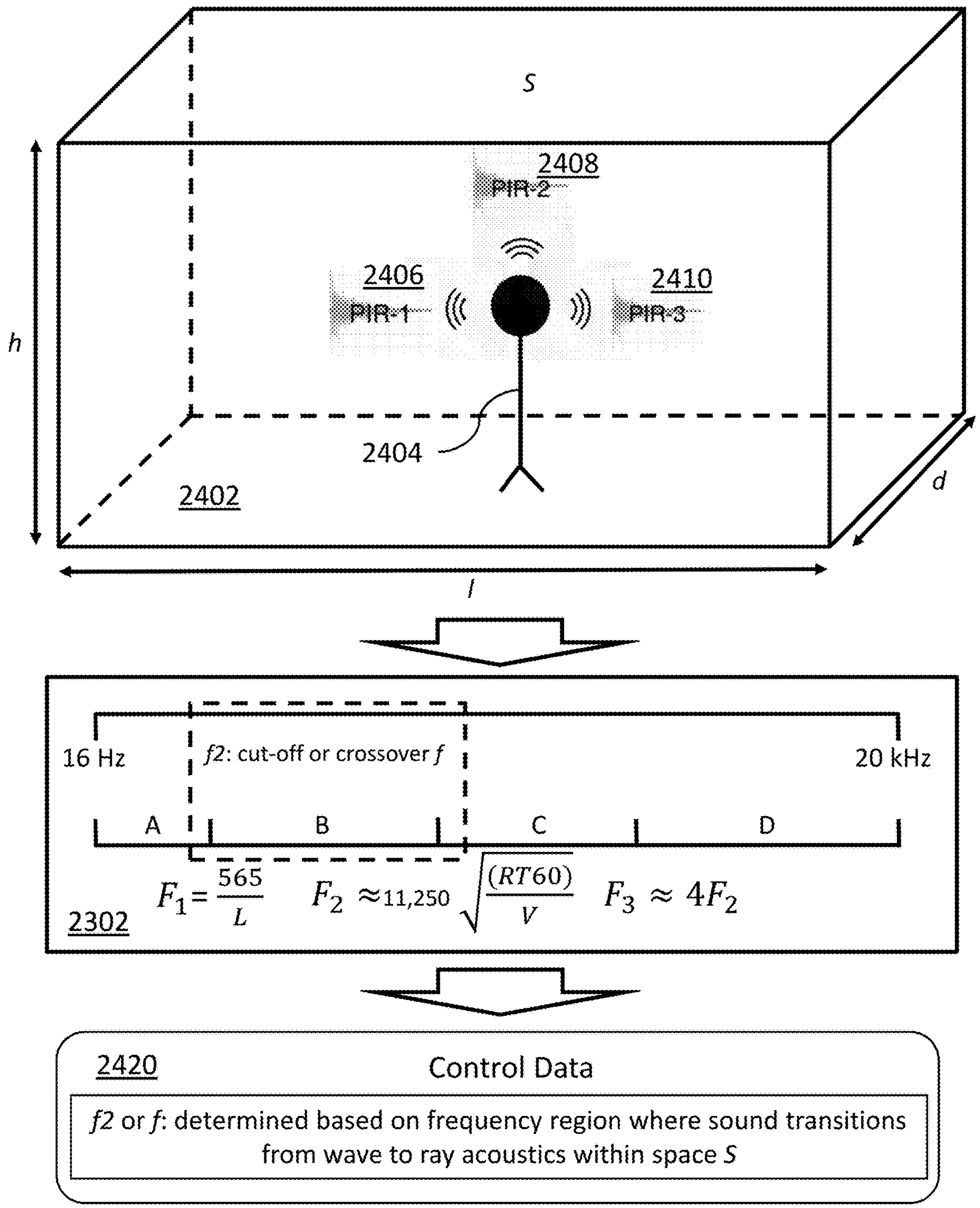

Turning now to FIGS. 23 and 24, the ADBF filter 502 of FIG. 5 is represented with additional details, in particular a frequency scale 2302. As previously described, the ADBF filter 502 may be used to take the audio stream 526 as an input and applied a high-pass filter to generate a first sub-audio stream and a low-pass filter to generate a second sub-audio stream. In some embodiments, the first sub-audio stream is inputted to an audio image renderer while the second sub-audio stream is directly inputted to a mixer without being processed by the audio image renderer. In some embodiments, the ADBF filter 502 may be dynamically controlled based on the control data 524. In some embodiments, the ADBF filter 502 is configured to access dimensional information relating a space in which positional impulse responses are measured. As exemplified in FIG. 24, positional impulse responses 2406, 2408 and 2410 are measured in a space 2402 which dimensions are defined by h, 1 and d. In the illustrated example, the positional impulse responses 2406, 2408 and 2410 are measured via a device 2404. The dimensions of the space 2402 are then relied upon to determine a frequency where sound transitions from wave to ray acoustics within the space 2402. In some embodiments, the frequency is a cut-off frequency (f2) and/or a crossover frequency (f). In the illustrated embodiment, the high-pass filter and/or the low-pass filter applied by the ADBF filter 502 are defined based on the cut-off frequency (f2) and/or the crossover frequency (f). In some embodiments, the cut-off frequency (f2) and/or the crossover frequency (f) are accessed by the ADBF filter 502 from the control data 524. The cut-off frequency (f2) and/or the crossover frequency (f) may be generated before the audio stream is processed by the ADBF filter 502. As a result, in some embodiments, the ADBF filter does not have to generate the cut-off frequency (f2) and/or the crossover frequency (f) but rather access them from a remote source which may have computed them and stored them into control data 2420.

In some embodiments, the cut-off frequency (f2) and/or the crossover frequency (f) may be defined based on the following equations:

$$F_1 = \frac{565}{L} \quad F_2 \approx 11{,}250\sqrt{\frac{(RT60)}{V}} \quad F_3 \approx 4F_2$$

As it can be seen on FIG. 24, the frequency scale 2302 defines an audible frequency scale composed of four regions: region A, region B, region C and region D. The regions A, B, C and D are defined by the frequencies $F_1$, $F_2$ and $F_3$. As it may become apparent to the person skilled in the art of the present technology, in region D, specular reflections and ray acoustics prevail. In region B, room modes dominate. Region C is a transition zone in which diffraction and diffusion dominate. There is no modal boost for sound in region A.

In some embodiments, $F_1$ is the upper boundary of region A and is determined based on a largest axial dimension of a space L. Region B defines a region where space dimensions are comparable to wavelength of sound frequencies (i.e., wave acoustics). $F_2$ defines a cut-off frequency or a crossover frequency in Hz. RT60 corresponds to a reverberation time of the room in seconds. In some embodiments, RT60 may be defined as the time it takes for sound pressure to reduce by 60 dB, measured from the moment a generated test signal is abruptly ended. V corresponds to a volume of the space. Region C defines a region where diffusion and diffraction dominate, a transition between region B (wave acoustics apply) and region D (ray acoustics apply).

Figure 25:
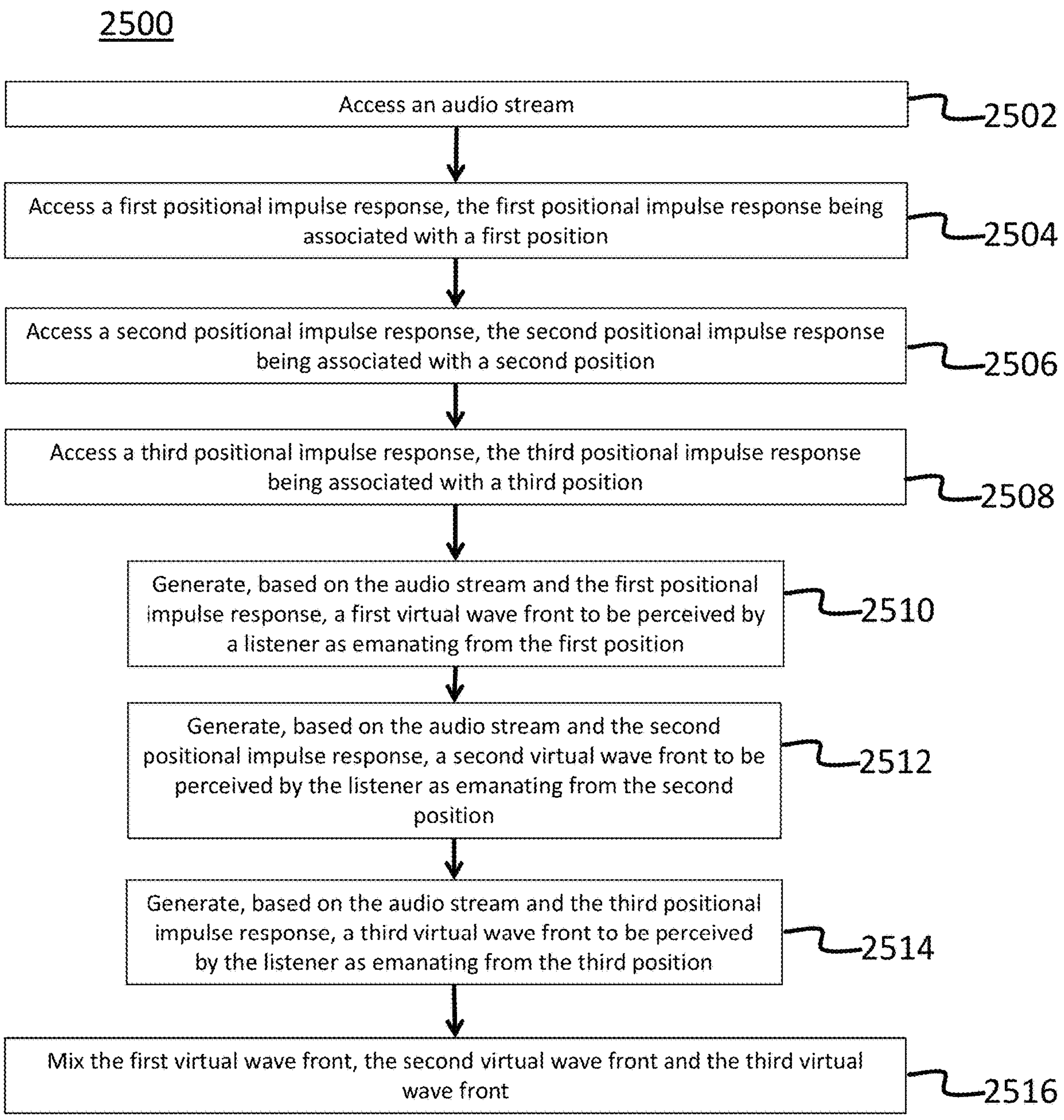
FIG. 25 is a diagram illustrating a flowchart illustrating a first computer-implemented method implementing embodiments of the present technology.

Turning now to FIG. 25, a flowchart illustrating a computer-implemented method 2500 of generating an audio image is illustrated. Even though reference is generally made to a method of generating an audio image, it should be understood that in the present context, the method 2500 may also be referred to as a method of rendering an audio image to a listener. In some embodiments, the computer-implemented method 2500 may be (completely or partially) implemented on a computing environment similar to the computing environment 100, such as, but not limited to the one or more devices 250.

The method 2500 starts at step 2502 by accessing an audio stream. In some embodiments, the audio stream is a first audio stream and the method 2500 further comprises accessing a second audio stream. In some embodiments, the audio stream is an audio channel. In some embodiments, the audio stream is one of a mono audio stream, a stereo audio stream and a multi-channel audio stream.

At a step 2504, the method 2500 accesses a first positional impulse response, the first positional impulse response being associated with a first position. At a step 2506, the method 2500 accesses a second positional impulse response, the second positional impulse response being associated with a second position. At a step 2508, the method 2500 accesses a third positional impulse response, the third positional impulse response being associated with a third position.

Then, the method 2500 generates an audio image by executing steps 2510, 2512 and 2514. In some embodiments, the steps 2510, 2512 and 2514 are executed in parallel. In some embodiments, the step 2510 comprises generating, based on the audio stream and the first positional impulse response, a first virtual wave front to be perceived by a listener as emanating from the first position. The step 2512 comprises generating, based on the audio stream and the second positional impulse response, a second virtual wave front to be perceived by the listener as emanating from the second position. The step 2514 comprises generating, based on the audio stream and the third positional impulse response, a third virtual wave front to be perceived by the listener as emanating from the third position.

In some embodiments, the method 2500 further comprises a step 2516. The step 2516 comprises mixing the first virtual wave front, the second virtual wave front and the third virtual wave front.

In some embodiments, generating the first virtual wave front comprises convolving the audio stream with the first positional impulse response; generating the second virtual wave front comprises convolving the audio stream with the second positional impulse response; and generating the third virtual wave front comprises convolving the audio stream with the third positional impulse response.

In some embodiments, the first positional impulse response comprises a first left positional impulse response associated with the first location and a first right positional impulse response associated with the first location; the second positional impulse response comprises a second left positional impulse response associated with the second location and a second right positional impulse response associated with the second location; and the third positional impulse response comprises a third left positional impulse response associated with the third location and a third right positional impulse response associated with the third location.

In some embodiments, generating the first virtual wave front, the second virtual wave front and the third virtual wave front comprises:

generating a summed left positional impulse response by summing the first left positional impulse response, the second left positional impulse response and the third left positional impulse response;

generating a summed right positional impulse response by summing the first right positional impulse response, the second left positional impulse response and the third left positional impulse response;

convolving the audio stream with the summed left positional impulse response; and convolving the audio stream with the summed right positional impulse response.

In some embodiments, convolving the audio stream with the summed left positional impulse response comprises generating a left channel signal; convolving the audio stream with the summed right positional impulse response comprises generating a right channel signal; and rendering the left channel signal and the right channel signal to a listener.

In some embodiments, generating the first virtual wave front, the second virtual wave front and the third virtual wave front comprises:

convolving the audio stream with the first left positional impulse response;

convolving the audio stream with the first right positional impulse response;

convolving the audio stream with the second left positional impulse response;

convolving the audio stream with the second right positional impulse response;

convolving the audio stream with the third left positional impulse response; and convolving the audio stream with the third right positional impulse response.

In some embodiments, the method 2500 further comprises:

generating a left channel signal by mixing the audio stream convolved with the first left positional impulse response, the audio stream convolved with the second left positional impulse response and the audio stream convolved with the third left positional impulse response;

generating a right channel signal by mixing the audio stream convolved with the first right positional impulse response, the audio stream convolved with the second right positional impulse response and the audio stream convolved with the third right positional impulse response; and rendering the left channel signal and the right channel signal to a listener.

In some embodiments, generating the first virtual wave front, generating the second virtual wave front and generating the third virtual wave front are executed in parallel.

In some embodiments, upon rendering the audio image to a listener, the first virtual wave front is perceived by the listener as emanating from a first virtual speaker located at the first position, the second virtual wave front is perceived by the listener as emanating from a second virtual speaker located at the second position; and the third virtual wave front is perceived by the listener as emanating from a third virtual speaker located at the third position.

In some embodiments, generating the first virtual wave front, generating the second virtual wave front and generating the third virtual wave front are executed synchronously.

In some embodiments, prior to generating the audio image, the method comprises:

accessing control data, the control data comprising the first position, the second position and the third position; and associating the first positional impulse response with the first position, the second positional impulse response with the second position and the third positional impulse response with the third position.

In some embodiments, the audio stream is a first audio stream and the method further comprises accessing a second audio stream.

In some embodiments, the audio image is a first audio image and the method further comprises:

generating a second audio image by executing the following steps:

generating, based on the second audio stream and the first positional impulse response, a fourth virtual wave front to be perceived by the listener as emanating from the first position;

generating, based on the second audio stream and the second positional impulse response, a fifth virtual wave front to be perceived by the listener as emanating from the second position; and generating, based on the second audio stream and the third positional impulse response, a sixth virtual wave front to be perceived by the listener as emanating from the third position.

In some embodiments, the audio image is defined by a combination of the first virtual wave front, the second virtual wave front and the third virtual wave front.

In some embodiments, the audio image is perceived by a listener as a virtual immersive audio volume defined by the combination of the first virtual wave front, the second virtual wave front and the third virtual wave front.

In some embodiments, the method 2500 further comprises accessing a fourth positional impulse response, the fourth positional impulse response being associated with a fourth position.

In some embodiments, generating, based on the audio stream and the fourth positional impulse response, a fourth virtual wave front to be perceived by the listener as emanating from the fourth position.

In some embodiments, the first position, the second position and the third position correspond to locations of an acoustic space associated with the first positional impulse response, the second positional impulse response and the third positional impulse response.

In some embodiments, the first position, the second position and the third position define a portion of spherical mesh.

In some embodiments, the first positional impulse response, the second positional impulse response and the third positional impulse response define a polygonal positional impulse response.

In some embodiments, the audio image is a first audio image and wherein the method further comprises:

accessing a fourth positional impulse response, the fourth positional impulse response being associated with a fourth position;

accessing a fifth positional impulse response, the fifth positional impulse response being associated with a fifth position;

accessing a sixth positional impulse response, the sixth positional impulse response being associated with a sixth position;

generating a second audio image by executing in parallel the following steps:

generating, based on the audio stream and the fourth positional impulse response, a fourth virtual wave front to be perceived by the listener as emanating from the fourth position;

generating, based on the audio stream and the fifth positional impulse response, a fifth virtual wave front to be perceived by the listener as emanating from the fifth position; and generating, based on the audio stream and the sixth positional impulse response, a sixth virtual wave front to be perceived by the listener as emanating from the sixth position.

In some embodiments, the first audio image and the second audio image define a complex audio image.

In some embodiments, the audio stream comprises a point source audio stream and the audio image is perceived by a user as a volumetric audio object of the point source audio stream defined by the combination of the first virtual wave front, the second virtual wave front and the third virtual wave front.

In some embodiments, the point source audio stream comprises a mono audio stream.

In some embodiments, the first positional impulse response, the second positional impulse response, the third positional impulse response and the audio stream are accessed from an audio image file.

In some embodiments, the first position, the second position and the third position are associated with control data, the control data being accessed from the audio image file.

In some embodiments, the audio stream is a first audio stream and the audio image file comprises a second audio stream.

In some embodiments, the audio image file has been generated by an encoder.

In some embodiments, the first positional impulse response, the second positional impulse response and the third positional impulse response are accessed by a sound-field positioner and the audio image is generated by an audio image renderer.

In some embodiments, the sound-field positioner and the audio image renderer define a decoder.

In some embodiments, before generating the audio image, the audio stream is filtered by an acoustically determined band filter.

In some embodiments, the audio stream is divided into a first audio sub-stream and a second audio sub-stream by the acoustically determined band filter.

In some embodiments, convolving the audio stream with the first positional impulse response comprises convolving the first audio sub-stream with the first positional impulse response, convolving the audio stream with the second positional impulse response comprises convolving the first audio sub-stream with the second positional impulse response and convolving the audio stream with the third positional impulse response comprises convolving the first audio sub-stream with the third positional impulse response.

In some embodiments, the first virtual wave front, the second virtual wave front and the third virtual wave front are mixed with the second audio sub-stream to generate the audio image.

In some embodiments, the acoustically determined band filter generates the first audio sub-stream by applying a high-pass filter (HPF) and the second audio sub-stream by applying a low-pass filter (LPF).

In some embodiments, at least one of a gain and a delay is applied to the second audio sub-stream.

In some embodiments, at least one of the HPF and the LPF is defined based on at least one of a cut-off frequency (f2) and a crossover frequency (f).

In some embodiments, the at least one of the cut-off frequency and the crossover frequency is based on a frequency where sound transitions from wave to ray acoustics within a space associated with at least one of the first positional impulse response, the second positional impulse response and the third positional impulse response.

In some embodiments, the at least one of the cut-off frequency (f2) and the crossover frequency (f) is associated with control data.

In some embodiments, the method 2500 further comprises outputting a m-channel audio output based on the audio image.

In some embodiments, the audio image is delivered to a user via at least one of a headphone set and a set of loudspeakers.

In some embodiments, at least one of convolving the audio stream with the first positional impulse response, convolving the audio stream with the second positional impulse response and convolving the audio stream with the third positional impulse response comprises applying a Fourier-transform to the audio stream.

In some embodiments, the first virtual wave front, the second virtual wave front and the third virtual wave front are mixed together.

In some embodiments, at least one of a gain, a delay and a filter/equalizer is applied to at least one of the first virtual wave front, the second virtual wave front and the third virtual wave front.

In some embodiments, applying at least one of the gain, the delay and the filter/equalizer to the at least one of the first virtual wave front, the second virtual wave front and the third virtual wave front is based on control data.

In some embodiments, the audio stream is a first audio stream and the method further comprises accessing multiple audio streams.

In some embodiments, the first audio stream and the multiple audio streams are mixed together before generating the audio image.

In some embodiments, the first position, the second position and the third position are controllable in real-time so as to morph the audio image.

Figure 26:
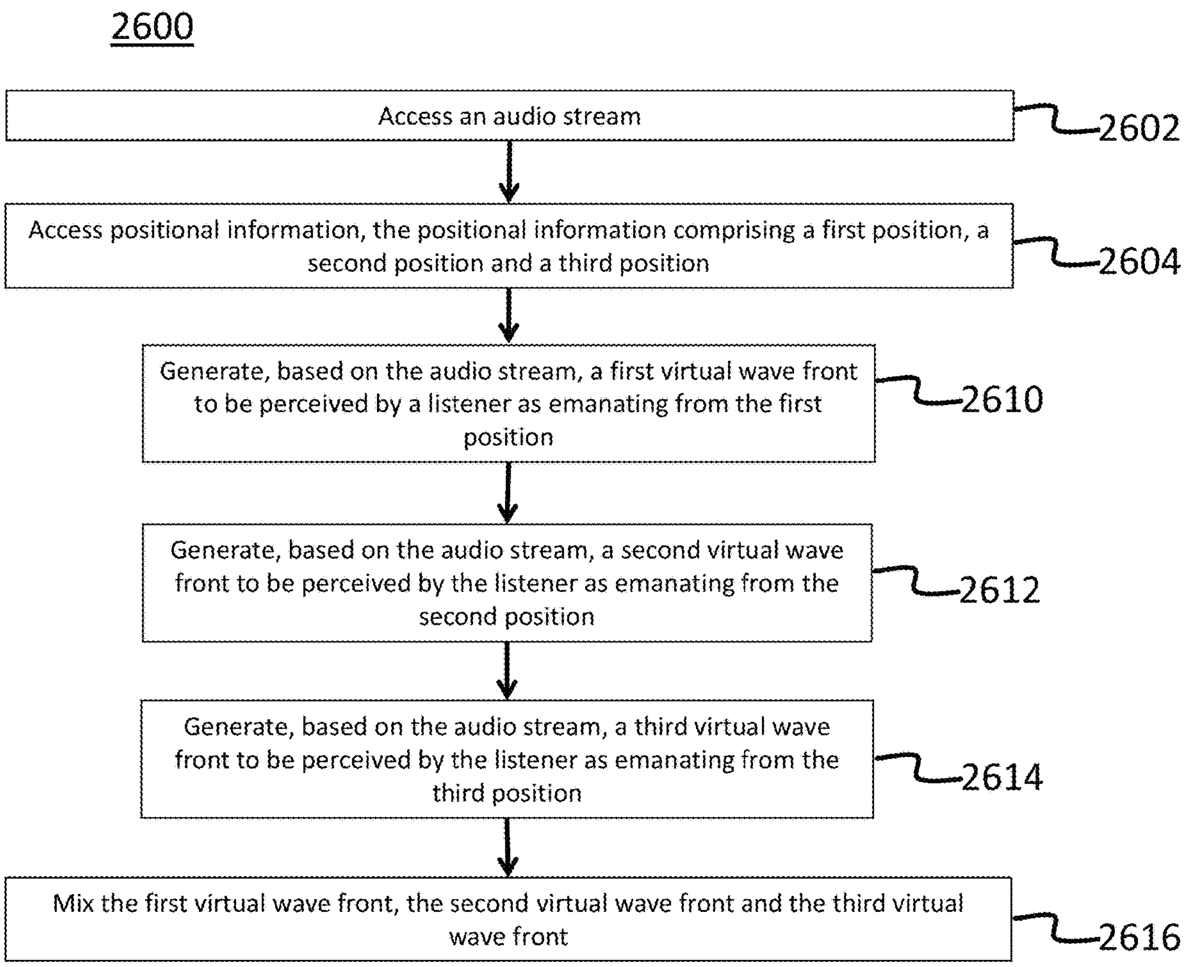
FIG. 26 is a diagram illustrating a flowchart illustrating a second computer-implemented method implementing embodiments of the present technology.

Turning now to FIG. 26, a flowchart illustrating a computer-implemented method 2600 of generating an audio image is illustrated. Even though reference is generally made to a method of generating an audio image, it should be understood that in the present context, the method 2600 may also be referred to as a method of rendering an audio image to a listener. In some embodiments, the computer-implemented method 2600 may be (completely or partially) implemented on a computing environment similar to the computing environment 100, such as, but not limited to the one or more devices 250.

The method 2600 starts at step 2602 by accessing an audio stream. Then, at a step 2604, the method 2600 accesses positional information, the positional information comprising a first position, a second position and a third position.

The method 2600 then executes steps 2610, 2612 and 2614 to generate an audio image. In some embodiments, the steps 2610, 2612 and 2614 are executed in parallel. The step 2610 comprises generating, based on the audio stream, a first virtual wave front to be perceived by a listener as emanating from the first position. The step 2612 comprises generating, based on the audio stream, a second virtual wave front to be perceived by the listener as emanating from the second position. The step 2614 comprises generating, based on the audio stream, a third virtual wave front to be perceived by the listener as emanating from the third position.

In some embodiments, upon rendering the audio image to the listener, the first virtual wave front is perceived by the listener as emanating from a first virtual speaker located at the first position, the second virtual wave front is perceived by the listener as emanating from a second virtual speaker located at the second position; and the third virtual wave front is perceived by the listener as emanating from a third virtual speaker located at the third position.

In some embodiments, at least one of generating the first virtual wave front, generating the second virtual wave front and generating the third virtual wave front comprises at least one of an acoustic rendering and a binaural rendering.

In some embodiments, the acoustic rendering comprises at least one direct sound rendering, early reflections rendering and late reflections rendering.

In some embodiments, the acoustic rendering comprises at least one of binaural room simulation, acoustic rendering based on DSP algorithm, acoustic rendering based on impulse response, acoustic rendering based on B-Format, acoustic rendering based on spherical harmonics, acoustic rendering based on environmental context simulation, acoustic rendering based on convolution with impulse response, acoustic rendering based on convolution with impulse response and HRTF processing, acoustic rendering based on auralization, acoustic rendering based on synthetic room impulse response, acoustic rendering based on ambisonics and binaural rendering, acoustic rendering based on high order ambisonics (HOA) and binaural rendering, acoustic rendering based on ray tracing and acoustic rendering based on image modeling.

In some embodiments, the binaural rendering comprises at least one of binaural signal processing, binaural rendering based on HRTF modeling, binaural rendering based on HRTF measurements, binaural rendering based on DSP algorithm, binaural rendering based on impulse response, binaural rendering based on digital filters for HRTF and binaural rendering based on calculation of HRTF sets.

In some embodiments, generating the first virtual wave front, generating the second virtual wave front and generating a third virtual wave front are executed synchronously.

In some embodiments, prior to generating the audio image, the method comprises:

- accessing a first positional impulse response associated with the first location;
- accessing a second positional impulse response associated with the second location; and
- accessing a third positional impulse response associated with the third location.

In some embodiments, generating the first virtual wave front comprises convolving the audio stream with the first positional impulse response; generating the second virtual wave front comprises convolving the audio stream with the second positional impulse response; and generating the third virtual wave front comprises convolving the audio stream with the third positional impulse response.

In some embodiments, prior to generating the audio image, the method 2600 comprises:

- accessing a first left positional impulse response associated with the first location;
- accessing a first right positional impulse response associated with the first location;
- accessing a second left positional impulse response associated with the second location;
- accessing a second right positional impulse response associated with the second location;
- accessing a third left positional impulse response associated with the third location; and
- accessing a third right positional impulse response associated with the third location.

In some embodiments, generating the first virtual wave front, the second virtual wave front and the third virtual wave front comprises:

- generating a summed left positional impulse response by summing the first left positional impulse response, the second left positional impulse response and the third left positional impulse response;
- generating a summed right positional impulse response by summing the first right positional impulse response, the second right positional impulse response and the third right positional impulse response;
- convolving the audio stream with the summed left positional impulse response; and
- convolving the audio stream with the summed right positional impulse response.

In some embodiments, convolving the audio stream with the summed left positional impulse response comprises generating a left channel; convolving the audio stream with the summed right positional impulse response comprises generating a right channel; and rendering the left channel and the right channel to a listener.

In some embodiments, the audio image is defined by a combination of the first virtual wave front, the second virtual wave front and the third virtual wave front.

In some embodiments, the method 2600 further comprises a step 2616 which comprises mixing the first virtual wave front, the second virtual wave front and the third virtual wave front.

Figure 27:
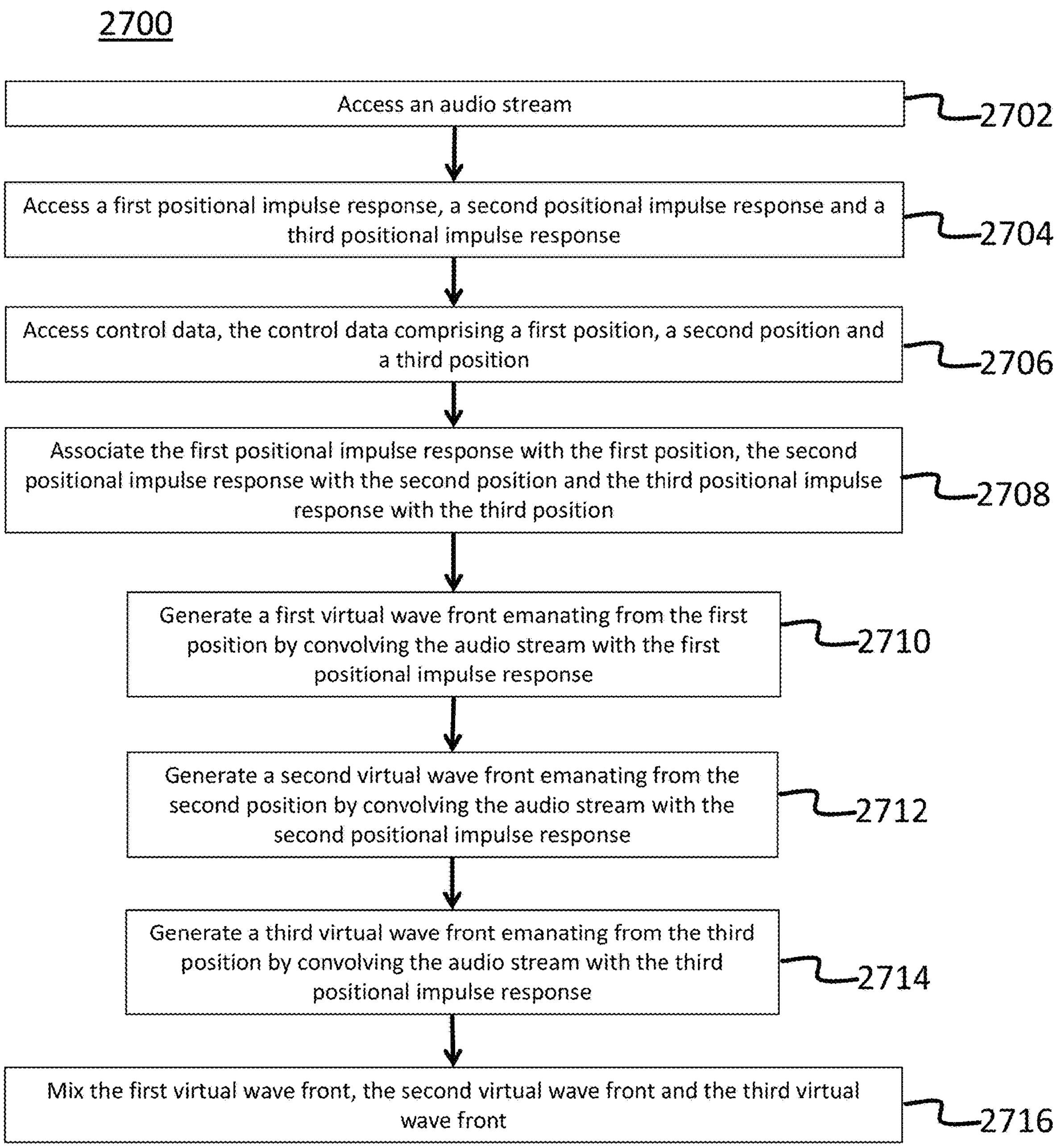
FIG. 27 is a diagram illustrating a flowchart illustrating a third computer-implemented method implementing embodiments of the present technology.

Turning now to FIG. 27, a flowchart illustrating a computer-implemented method 2700 of generating a volumetric audio image is illustrated. Even though reference is generally made to a method of generating a volumetric audio image, it should be understood that in the present context, the method 2700 may also be referred to as a method of rendering a volumetric audio image to a listener. In some embodiments, the computer-implemented method 2700 may be (completely or partially) implemented on a computing environment similar to the computing environment 100, such as, but not limited to the one or more devices 250.

The method 2700 starts at step 2702 by accessing an audio stream. Then, at a step 2704, the method 2700 accesses a first positional impulse response, a second positional impulse response and a third positional impulse response.

Then, at a step 2706, the method 2700 accesses control data, the control data comprising a first position, a second position and a third position. At a step 2708, the method 2700 associates the first positional impulse response with the first position, the second positional impulse response with the second position and the third positional impulse response with the third position.

The method 2700 then generates the volumetric audio image by executing steps 2710, 2712 and 2714. In some embodiments, the steps 2710, 2712 and 2714 are executed in parallel. The step 2710 comprises generating a first virtual wave front emanating from the first position by convolving the audio stream with the first positional impulse response. The step 2712 comprises generating a second virtual wave front emanating from the second position by convolving the audio stream with the second positional impulse response.

The step 2714 comprises generating a third virtual wave front emanating from the third position by convolving the audio stream with the third positional impulse response.

In some embodiments, the method 2700 further comprises a step 2716 which comprises mixing the first virtual wave front, the second virtual wave front and the third virtual wave front.

Figure 28:
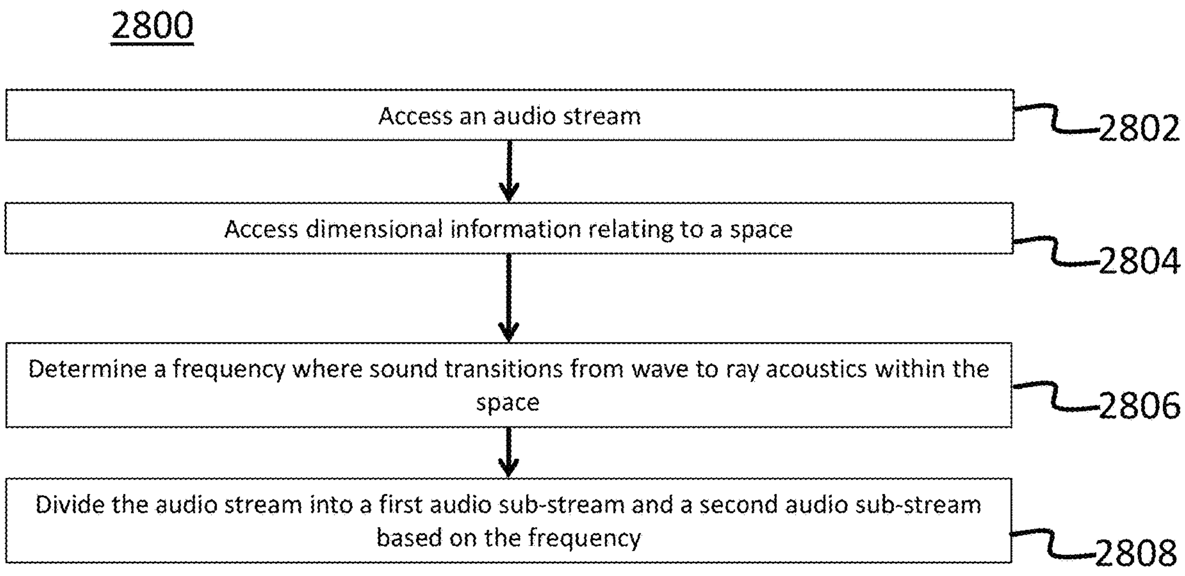
FIG. 28 is a diagram illustrating a flowchart illustrating a fourth computer-implemented method implementing embodiments of the present technology.

Turning now to FIG. 28, a flowchart illustrating a computer-implemented method 2800 of filtering an audio stream is illustrated. In some embodiments, the computer-implemented method 2800 may be (completely or partially) implemented on a computing environment similar to the computing environment 100, such as, but not limited to the one or more devices 250.

The method 2800 starts at step 2802 by accessing an audio stream. Then, at a step 2804, the method 2800 accesses dimensional information relating to a space. The method 2800 then determines, at a step 2806, a frequency where sound transitions from wave to ray acoustics within the space. At a step 2808, the method 2800 divides the audio stream into a first audio sub-stream and a second audio sub-stream based on the frequency.

In some embodiments, dividing the audio stream comprises generating the first audio sub-stream by applying a high-pass filter (HPF) and the second audio sub-stream by applying a low-pass filter (LPF). In some embodiments, at least one of a gain and a delay is applied to the second audio sub-stream. In some embodiments, the frequency is one of a cut-off frequency (f2) and a crossover frequency (f). In some embodiments, at least one of the HPF and the LPF is defined based on at least one of the cut-off frequency (f2) and the crossover frequency (f).

In some embodiments, at least one of the cut-off frequency (f2) and the crossover frequency (f) is associated with control data. In some embodiments, the space is associated with at least one of a first positional impulse response, a second positional impulse response and a third positional impulse response.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user and/or the listener enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of decoding audio, the method comprising:

accessing an audio file, an audio container, or an audio bitstream; and decoding the audio file, audio container, or audio bitstream, wherein the decoding comprises:

accessing an audio stream in the audio file, audio container, or audio bitstream, accessing a first positional impulse response in the audio file, audio container, or audio bitstream, the first positional impulse response being associated with a first position, accessing a second positional impulse response in the audio file, audio container, or audio bitstream, the second positional impulse response being associated with a second position, accessing a third positional impulse response in the audio file, audio container, or audio bitstream, the third positional impulse response being associated with a third position, wherein the first positional impulse response, second positional impulse response, and third positional impulse response are representative of acoustic characteristics of a physical space containing the first position, second position, and third position, generating, based on the audio stream and the first positional impulse response, a first virtual wave front to be perceived by a listener as emanating from the first position, generating, based on the audio stream and the second positional impulse response, a second virtual wave front to be perceived by the listener as emanating from the second position, and generating, based on the audio stream and the third positional impulse response, a third virtual wave front to be perceived by the listener as emanating from the third position.

2. The method of claim 1, wherein:

generating the first virtual wave front comprises convolving the audio stream with the first positional impulse response;

generating the second virtual wave front comprises convolving the audio stream with the second positional impulse response; and generating the third virtual wave front comprises convolving the audio stream with the third positional impulse response.

3. The method of claim 1, wherein:

the first positional impulse response comprises a first left positional impulse response associated with the first position and a first right positional impulse response associated with the first position;

the second positional impulse response comprises a second left positional impulse response associated with the second position and a second right positional impulse response associated with the second position; and the third positional impulse response comprises a third left positional impulse response associated with the third position and a third right positional impulse response associated with the third position.

4. The method of claim 3, wherein generating the first virtual wave front, the second virtual wave front and the third virtual wave front comprises:

generating a summed left positional impulse response by summing the first left positional impulse response, the second left positional impulse response and the third left positional impulse response;

generating a summed right positional impulse response by summing the first right positional impulse response, the second right positional impulse response and the third right positional impulse response;

convolving the audio stream with the summed left positional impulse response; and convolving the audio stream with the summed right positional impulse response.

5. The method of claim 4, wherein:

convolving the audio stream with the summed left positional impulse response comprises generating a left channel signal; and convolving the audio stream with the summed right positional impulse response comprises generating a right channel signal, and wherein the method further comprises rendering the left channel signal and the right channel signal to the listener.

6. The method of claim 3, wherein generating the first virtual wave front, the second virtual wave front and the third virtual wave front comprises:

convolving the audio stream with the first left positional impulse response;

convolving the audio stream with the first right positional impulse response;

convolving the audio stream with the second left positional impulse response;

convolving the audio stream with the second right positional impulse response;

convolving the audio stream with the third left positional impulse response; and convolving the audio stream with the third right positional impulse response.

7. The method of claim 6, further comprising:

generating a left channel signal by mixing the audio stream convolved with the first left positional impulse response, the audio stream convolved with the second left positional impulse response and the audio stream convolved with the third left positional impulse response;

generating a right channel signal by mixing the audio stream convolved with the first right positional impulse response, the audio stream convolved with the second right positional impulse response and the audio stream convolved with the third right positional impulse response; and rendering the left channel signal and the right channel signal to the listener.

8. The method of claim 1, wherein generating the first virtual wave front, generating the second virtual wave front and generating the third virtual wave front are executed in parallel.

9. The method of claim 1, wherein, upon rendering the first virtual wave front, the second virtual wave front, and the third virtual wave front to the listener, the first virtual wave front is perceived by the listener as emanating from a first virtual speaker located at the first position, the second virtual wave front is perceived by the listener as emanating from a second virtual speaker located at the second position; and the third virtual wave front is perceived by the listener as emanating from a third virtual speaker located at the third position.

10. The method of claim 1 wherein the method comprises:

accessing control data, the control data comprising the first position, the second position and the third position; and associating the first positional impulse response with the first position, the second positional impulse response with the second position and the third positional impulse response with the third position.

11. The method of claim 10, wherein:

the first position, the second position and the third position define a portion of a spherical mesh;

the control data allows positioning the first positional impulse response, the second positional impulse response and the third positional impulse response on the spherical mesh; and the first position, the second position and the third position are modifiable.

12. The method of claim 1, wherein the method further comprises:

accessing a second audio stream;

generating, based on the second audio stream and the first positional impulse response, a fourth virtual wave front to be perceived by the listener as emanating from the first position;

generating, based on the second audio stream and the second positional impulse response, a fifth virtual wave front to be perceived by the listener as emanating from the second position; and generating, based on the second audio stream and the third positional impulse response, a sixth virtual wave front to be perceived by the listener as emanating from the third position.

13. The method of claim 1, wherein the audio stream is one of a mono audio stream, a stereo audio stream and a multi-channel audio stream.

14. The method of claim 1, further comprising generating an audio image defined by a combination of the first virtual wave front, the second virtual wave front and the third virtual wave front.

15. The method of claim 1, wherein the first position, the second position and the third position define a portion of spherical mesh.

16. The method of claim 1, wherein the first positional impulse response, the second positional impulse response and the third positional impulse response define a polygonal positional impulse response.

17. The method of claim 1, further comprising filtering the audio stream by dividing the audio stream into a first audio sub-stream by applying a high-pass filter (HPF) and a second audio sub-stream by applying a low-pass filter (LPF), wherein at least one of the HPF or the LPF is defined based on at least one of a cut-off frequency (f2) or a crossover frequency (f), the at least one of the cut-off frequency or the crossover frequency being based on a frequency where sound transitions from wave to ray acoustics within an acoustic space.

18. The method of claim 1, wherein the first positional impulse response, the second positional impulse response and the third positional impulse response are each associated with a different pulse, each one of the different pulses being representative of acoustic characteristics of an acoustic space at a given position.

19. The method of claim 1, wherein generating the first virtual wave front, generating the second virtual wave front, and generating the third virtual wave front are executed synchronously.

20. A system comprising at least one processor and memory storing executable instructions which, when executed by the at least one processor, cause the system to:

access an audio file, an audio container, or an audio bitstream; and decode the audio file, audio container, or audio bitstream, wherein the decoding comprises:

accessing an audio stream in the audio file, audio container, or audio bitstream, accessing a first positional impulse response in the audio file, audio container, or audio bitstream, the first positional impulse response being associated with a first position, accessing a second positional impulse response in the audio file, audio container, or audio bitstream, the second positional impulse response being associated with a second position, accessing a third positional impulse response in the audio file, audio container, or audio bitstream, the third positional impulse response being associated with a third position, wherein the first positional impulse response, second positional impulse response, and third positional impulse response are representative of acoustic characteristics of a physical space containing the first position, second position, and third position, generating, based on the audio stream and the first positional impulse response, a first virtual wave front to be perceived by a listener as emanating from the first position, generating, based on the audio stream and the second positional impulse response, a second virtual wave front to be perceived by the listener as emanating from the second position, and generating, based on the audio stream and the third positional impulse response, a third virtual wave front to be perceived by the listener as emanating from the third position.

21. A non-transitory computer-readable medium comprising executable instructions which, when executed by at least one processor, cause the at least one processor to:

access an audio file, an audio container, or an audio bitstream; and decode the audio file, audio container, or audio bitstream, wherein the decoding comprises:

accessing an audio stream in the audio file, audio container, or audio bitstream, accessing a first positional impulse response in the audio file, audio container, or audio bitstream, the first positional impulse response being associated with a first position, accessing a second positional impulse response in the audio file, audio container, or audio bitstream, the second positional impulse response being associated with a second position, accessing a third positional impulse response in the audio file, audio container, or audio bitstream, the third positional impulse response being associated with a third position, wherein the first positional impulse response, second positional impulse response, and third positional impulse response are representative of acoustic characteristics of a physical space containing the first position, second position, and third position, generating, based on the audio stream and the first positional impulse response, a first virtual wave front to be perceived by a listener as emanating from the first position, generating, based on the audio stream and the second positional impulse response, a second virtual wave front to be perceived by the listener as emanating from the second position, and generating, based on the audio stream and the third positional impulse response, a third virtual wave front to be perceived by the listener as emanating from the third position.

* * * * *